(12) United States Patent
Nattkemper et al.

(10) Patent No.: US 7,567,665 B2
(45) Date of Patent: Jul. 28, 2009

(54) FUNCTION FOR CONTROLLING LINE POWERED NETWORK ELEMENT

(75) Inventors: Dieter H. Nattkemper, Raleigh, NC (US); Kenneth Lee Walker, III, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1016 days.

(21) Appl. No.: 10/449,910

(22) Filed: May 30, 2003

(65) Prior Publication Data

US 2004/0041697 A1 Mar. 4, 2004

Related U.S. Application Data

(63) Continuation-in-part of application No. 10/134,323, filed on Apr. 29, 2002.

(51) Int. Cl.
H04M 1/00 (2006.01)
(52) U.S. Cl. .................. 379/413; 379/395.01; 307/116; 361/764; 713/300
(58) Field of Classification Search .................. 379/413, 379/395.01; 307/116, 44; 361/764; 323/304, 323/318; 713/300
See application file for complete search history.

(56) References Cited

U.S. PATENT DOCUMENTS

| | | | |
|---|---|---|---|
| 5,283,905 A | 2/1994 | Saadeh et al. | |
| 5,627,833 A | 5/1997 | Bliven | |
| 5,666,538 A | 9/1997 | DeNicola | |
| 5,694,398 A | 12/1997 | Doll et al. | |
| 5,761,429 A * | 6/1998 | Thompson | ................... 709/224 |
| 5,774,689 A | 6/1998 | Curtis et al. | |
| 5,777,769 A | 7/1998 | Coutinho | |
| 5,818,125 A | 10/1998 | Manchester | |
| 5,926,544 A * | 7/1999 | Zhou | .......................... 379/413 |
| 5,990,575 A * | 11/1999 | Flaugher | ...................... 307/23 |
| 6,176,710 B1 | 1/2001 | Ewing et al. | |
| 6,366,657 B1 | 4/2002 | Yagel et al. | |
| 6,396,849 B1 * | 5/2002 | Sarkissian et al. | ........... 370/490 |
| 6,496,515 B2 * | 12/2002 | Lefebvre et al. | ............ 370/455 |
| 6,546,089 B1 | 4/2003 | Chea, Jr. et al. | |
| 6,587,953 B1 | 7/2003 | Torikai | |
| 6,606,383 B1 | 8/2003 | Robinson et al. | |
| 6,933,835 B2 | 8/2005 | Kline | |

(Continued)

FOREIGN PATENT DOCUMENTS

| | | |
|---|---|---|
| WO | WO-00/41496 | 7/2000 |
| WO | WO-01/58123 | 8/2001 |

OTHER PUBLICATIONS

Navini Networks, "Navini Networks™ Selects Objectivity to Power Management System for Ripwave™ Nomadic Wireless Broadband Technology," Jul. 23, 2001, Published in: US, p. 1.

*Primary Examiner*—Olisa Anwah
(74) *Attorney, Agent, or Firm*—Fogg & Powers LLC

(57) ABSTRACT

A method of controlling power in a network element includes powering the network element by receiving power from a power communication medium and providing a telecommunication service over a service communication medium. The method further includes monitoring a primitive related to the powering of the network element and controlling the powering of the network element based on the primitive.

86 Claims, 15 Drawing Sheets

U.S. PATENT DOCUMENTS

| | | |
|---|---|---|
| 6,947,554 B2 * | 9/2005 | Freyman et al. ............. 379/413 |
| 6,978,014 B1 * | 12/2005 | Bentley ...................... 379/413 |
| 2002/0002593 A1 | 1/2002 | Ewing et al. |
| 2002/0044525 A1 * | 4/2002 | Czerwiec et al. ............ 370/216 |
| 2002/0117899 A1 | 8/2002 | Seefried et al. |
| 2003/0003941 A1 | 1/2003 | Goto et al. |
| 2003/0014877 A1 | 1/2003 | Howard et al. |
| 2003/0154276 A1 | 8/2003 | Caveny |
| 2003/0185385 A1 | 10/2003 | Boudreaux, Jr. et al. |
| 2004/0196134 A1 | 10/2004 | Milanczak |
| 2005/0064914 A1 | 3/2005 | Gough |
| 2005/0163152 A1 | 7/2005 | Binder |

* cited by examiner

FUNCTION FOR CONTROLLING LINE POWERED NETWORK ELEMENT

CROSS REFERENCE TO RELATED APPLICATIONS

This application is a continuation-in-part of application Ser. No. 10/134,323, filed on Apr. 29, 2002 and entitled MANAGING POWER IN A LINE POWERED NETWORK ELEMENT (the '323 Application). The '323 Application is incorporated herein by reference.

U.S. patent application Ser. No. 10/449,259 (pending), entitled "NETWORK ELEMENT IN A LINE POWERED NETWORK,";

U.S. patent application Ser. No. 10/449,682 (pending), entitled "ELEMENT MANAGEMENT SYSTEM IN A LINE POWERED NETWORK,";

U.S. patent application Ser. No. 10/449,546 (issued), entitled "SPLITTER,";

U.S. patent application Ser. No. 10/449,917 (issued), entitled "CURRENT SENSE CIRCUIT IN A LINE POWERED NETWORK ELEMENT,";

U.S. patent application Ser. No. 10/449,496 (issued), entitled "INPUT VOLTAGE SENSE CIRCUIT IN A LINE POWERED NETWORK ELEMENT,";

U.S. patent application Ser. No. 10/448,884 (abandoned), entitled "LIGHTNING PROTECTION FOR A NETWORK ELEMENT,"; and U.S. patent application Ser. No. 10/449,547 (pending), entitled "POWER RAMP-UP IN A LINE-POWERED NETWORK ELEMENT SYSTEM,".

U.S. patent application Ser. No. 10/448,884, entitled "LIGHTNING PROTECTION FOR A NETWORK ELEMENT,"

U.S. patent application Ser. No. 10/449,547, entitled "POWER RAMP-UP IN A LINE-POWERED NETWORK ELEMENT SYSTEM,"

TECHNICAL FIELD

The present invention relates generally to the field of telecommunications, and, in particular, to managing line power for network elements in an access network.

BACKGROUND

Telecommunications networks transport signals between user equipment at diverse locations. A telecommunications network includes a number of components. For example, a telecommunications network typically includes a number of switching elements that provide selective routing of signals between network elements. Additionally, telecommunications networks include communication media, e.g., twisted pair, fiber optic cable, coaxial cable or the like that transport the signals between switches. Further, some telecommunications networks include access networks.

For purposes of this specification, the term access network means a portion of a telecommunication network, e.g., the public switched telephone network (PSTN), that allows subscriber equipment or devices to connect to a core network. For example, an access network is the cable plant and equipment normally located in a central office or outside plant cabinets that directly provides service interface to subscribers in a service area. The access network provides the interface between the subscriber service end points and the communication network that provides the given service. An access network typically includes a number of network elements. A network element is a facility or the equipment in the access network that provides the service interfaces for the provisioned telecommunication services. A network element may be a stand-alone device or may be distributed among a number of devices.

There are a number of conventional forms for access networks. For example, the digital loop carrier is an early form of access network. The conventional digital loop carrier transported signals to and from subscriber equipment using two network elements. At the core network side, a central office terminal is provided. The central office terminal is connected to the remote terminal over a high-speed digital link, e.g., a number of T1 lines or other appropriate high-speed digital transport medium. The remote terminal of the digital loop carrier typically connects to the subscriber over a conventional twisted pair drop.

The remote terminal of a digital loop carrier is often deployed deep in the customer service area. The remote terminal typically has line cards and other electronic circuits that need power to operate properly. In some applications, the remote terminal is powered locally. Unfortunately, to prevent failure of the remote terminal due to loss of local power, a local battery plant is typically used. This adds to the cost and complicates the maintainability of the remote terminal, due to the outside plant operational requirements which stipulate operation over extended temperature ranges.

In some networks, the remote terminal is fed power over a line from the central office. This is referred to as line feeding or line powering and can be accomplished through use of an AC or a DC source. Thus, if local power fails, the remote terminal still functions because it is typically powered over the line using a battery-backed power source. This allows the remote terminal to offer critical functions like lifeline plain old-fashioned telephone service (POTS) even during a power outage.

Over time, the variety of services offered over telecommunications networks has changed. Originally, the telecommunications networks were designed to carry narrowband, voice traffic. More recently, the networks have been modified to offer broadband services. These broadband services include services such as digital subscriber line (DSL) services. As time goes on, other broadband services will also be supported. These new services often come with increased power requirements.

As the service offerings have changed, the manner in which remote terminals are powered has not changed. The various services now offered are not all on equal footing. Data service today, unlike lifeline POTS, typically is not considered a necessity. Further, even among the other broadband services, there is a spectrum of variables affecting the level of service that a given subscriber wants and what the subscriber is willing to pay for it. Despite these changes in service offerings, the way that power is provided to the access equipment has not changed to keep pace with the service advancements.

Therefore, there is a need in the art for improvements in the manner in which power is provided to network elements in an access network.

SUMMARY

In one embodiment, a method of controlling power in a network element includes powering the network element by receiving power from a power communication medium and providing a telecommunication service over a service communication medium. The method further includes monitoring a primitive related to the powering of the network element and controlling the powering of the network element based on the primitive.

In another embodiment, a network element includes a power interface adapted to couple the network element to a power communication medium to receive power from the power communication medium. The network interface also includes a service interface adapted to couple the network element to a service communication medium to provide a telecommunication service over the service communication medium. The network element also includes a control module coupled to at least the power interface. The control module monitors and controls the operation of the power interface.

In another embodiment, a method of controlling power in a network element includes supplying power to a power communication medium and providing a telecommunication service over a service communication medium. The method further includes monitoring a primitive related to supplying power to the power communication medium and controlling supplying power to the power communication medium based on the primitive.

In another embodiment, a network element includes a power interface adapted to couple the network element to a power communication medium to supply to the power communication medium. The network interface further includes a service interface adapted to couple the network element to a service communication medium to provide a telecommunication service over the service communication medium. The network element further includes a control module coupled to at least the power interface. The control module monitors and controls the operation of the power interface.

DETAILED DESCRIPTION

Figure 1:
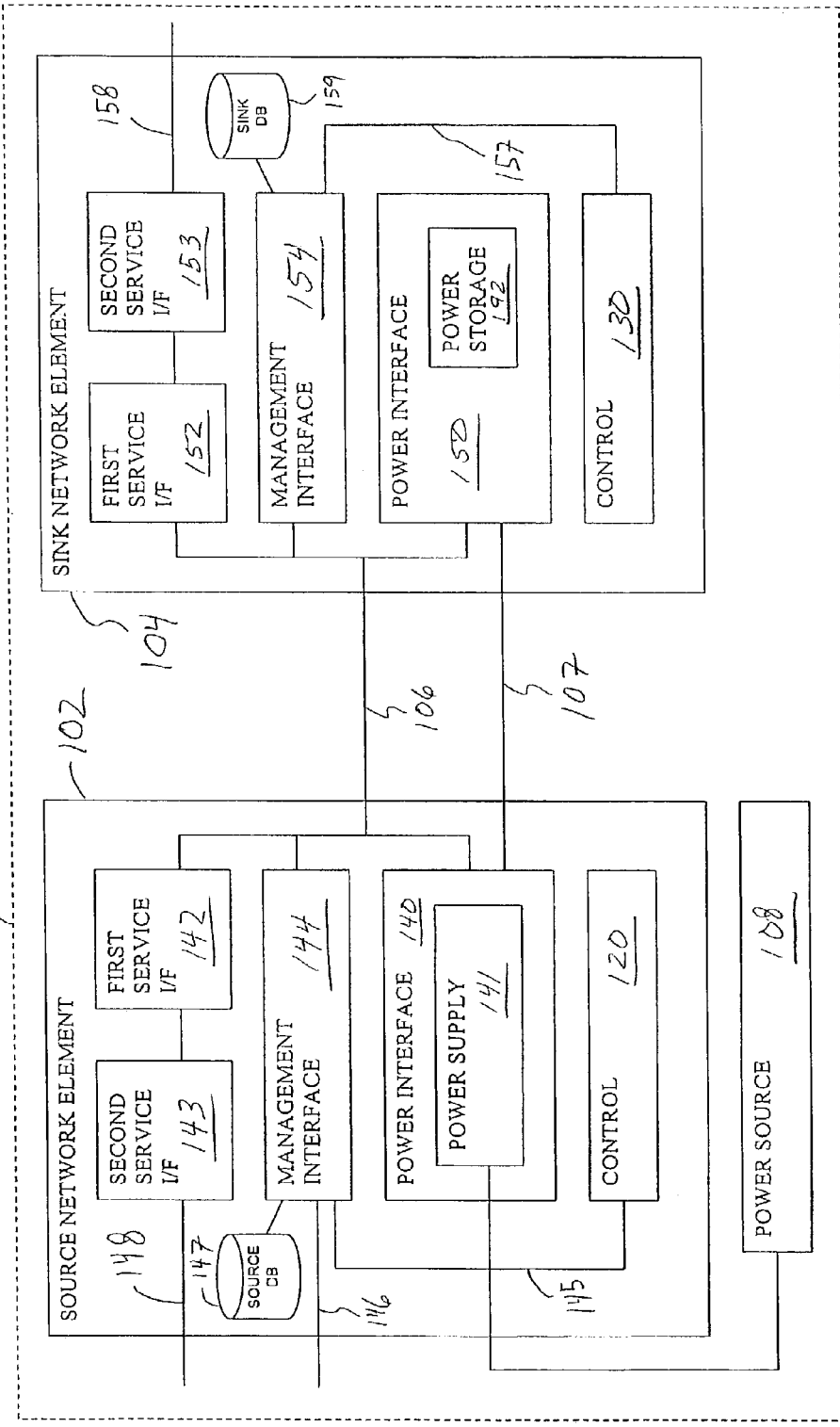
FIG. 1 is a block diagram of one embodiment of a network including a line powered network element.

FIG. 1 is a block diagram of one embodiment of a network 100. Network 100 includes network elements 102 and 104. Network elements 102 and 104 are coupled to one another over at least one communication medium 106. In the embodiment shown in FIG. 1, network element 102 (also referred to here as the "source network element" 102) supplies power to network element 104 (also referred to here as the "sink network element" 104) over the communication medium 106.

In the embodiment shown in FIG. 1, the source network element 102 and the sink network element 104 are located within an access network 112. For example, in one such embodiment, the source network element 102 includes a central office terminal located in a cabinet or in the central office of a service provider. In such an embodiment, the sink network element 104 includes a remote terminal located, for example, in the outside plant of the access network 112. The remote terminal in such an embodiment is located within an environmentally harden pedestal or other enclosure.

In the embodiment shown in FIG. 1, the source network element 102 includes a power interface 140 that applies power to a communication medium 106 for use by the sink network element 104. Typically, the communication medium 106 includes a conductive medium (for example, one or more copper wires) over which power from the source network element 102 is supplied to the sink network element 104. In other embodiments, power is supplied from the source network element 102 to the sink network element 104 over another conductive medium 107 in addition to, or instead of, communication medium 106. In some such embodiments, the conductive medium 107 is also used to provide a telecommunication service. In some other embodiments, the conductive medium service 107 is not used, during normal operation or otherwise, to provide a telecommunication service.

The power interface 140 is coupled to a power source 108. For example, in one embodiment, power source 108 includes an AC and/or DC power source such as a battery and/or the main power grid and the power interface 140 includes a power supply 141 that is powered by the power source 108.

The source network element 102 further includes first and second service interfaces 142 and 143. First service interface 142 is coupled to a communication medium that couples the source network element 102 to the sink network element 104 and over which a first telecommunication service is provided therebetween. The second service interface 143, in the embodiment shown in FIG. 1, is coupled to a network side service interface 148 that couples the source network element 102 to another network and over which a second telecommunication service is provided therebetween. The first and second service interfaces 142 and 143 are coupled to one another so that traffic received from the first and second telecommunication services can be transmitted out on the other telecommunication service as needed. In one embodiment, the first telecommunication service includes an HDSL2 service and the second telecommunication service includes a DSX-1 service.

The embodiment of a source network element 102 shown in FIG. 1 also includes a management interface 144. The management interface 144 is coupled to a communication medium in order to communicate management data between the source network element 102 and the sink network element 104. For example, in one embodiment, the management data includes provisioning data supplied from the source network element 102 to the sink network element 104 and status and alarm data from the sink network element 104 to the source network element 102. The management data is stored in a source database 147. For example, in one embodiment, primitives (and/or other types of data) are stored in the source database 147 and are used in the various monitoring and control processes described here. Additional details regarding a database for the storage of primitives in a source network element are found in the '359 Application.

Such management data, in one embodiment, is communicated between, for example, the source network element 102 and an element management system (and/or other management applications such as a network management system) over an element management interface 146. In one embodiment, the element management system interface includes a connection to a local area network that couples the source network element 102 to a standalone workstation on which the element management system executes. Additional details regarding the interaction between a management system such as an element management system and source and sink network elements 102 and 104 are found in the '360 Application.

The sink network element 104 further includes first and second service interfaces 152 and 153. First service interface 152 is coupled to a communication medium that couples the sink network element 104 to the source network element 102 and over which a first telecommunication service is provided therebetween. The second service interface 153, in the embodiment shown in FIG. 1, is coupled to a line side service communication medium 158 that couples the sink network element 104 to another network element and over which a second telecommunication service is provided therebetween. For example, in one embodiment, the sink network element 104 is coupled to a downstream network element (for example, customer located equipment such as a modem). The first and second service interfaces 152 and 153 are coupled to one another so that traffic received from the first and second telecommunication services can be transmitted out on the other telecommunication service as needed. In one embodiment, the first telecommunication service includes an HDSL2 service and the second telecommunication service includes an asymmetrical DSL service (ADSL).

In the embodiment shown in FIG. 1, the sink network element 104 includes a power interface 150. The power interface 150 is coupled to the communication medium 106 and extracts the power supplied on the communication medium 106 by the source network element 102. The power extracted from the communication medium 106 is supplied to the appropriate components of the network element 104. In other embodiments, power interface 150 is also coupled to the conductive medium 107 in addition to, or instead of, communication medium 106.

The embodiment of a sink network element 104 shown in FIG. 1 also includes a management interface 154. The management interface 154 is coupled to a communication medium in order to communicate management data between the source network element 102 and the sink network element 104. The management data is stored in a sink database 159. For example, in one embodiment, primitives (and/or other types of data) are stored in the sink database 159 and are used in the various monitoring and control processes described here. Additional details regarding a database for the storage of primitives in a sink network element are found in the '359 Application.

In the embodiment shown in FIG. 1, the power interface 140 and the first service interface 142 of the source network element 102 are coupled to the same communication medium 106. Likewise, the power interface 150 and the first service interface 152 of the sink network element 104 are also coupled to the same communication medium 106. In such an embodiment, the communication medium 106 is used to provide a telecommunication service between the source network element 102 and the sink network element 104 in addition to supplying power from the source network element 102 to the sink network element 104. For example, in one such embodiment, the communication medium 106 includes one or more twisted-pair telephone lines that provide plain old telephone service and/or digital subscriber line (DSL) service. Examples of DSL service include high-bit rate DSL (HDSL) service, high-bit-rate DSL 2 (HDSL2) service, high-bit-rate DSL 4 (HDSL4) service, or symmetric DSL service conforming to the International Telecommunication Union (ITU) standard G.991.2 (G.SHDSL).

In addition, in the embodiment shown in FIG. 1, the management interface 154 of the sink network element 104 is coupled to the management interface 144 of the source network element 102 over the communication medium 106. For example, in one such an embodiment, management data is included in the telecommunication service traffic transferred over the communication medium 106, for example, in a special channel included in the data traffic.

In one embodiment, the power received over the communication medium 106 provides the sole power for the sink network element 104. In other embodiments, sink network element 104 receives additional power from another power source (for example, an AC or DC power source such as a battery and/or the main power grid). In one such other embodiment, the additional power from another power source is the primary power source and the power supplied to the sink network element 104 over the communication medium 106 is a backup source of power. In another embodiment, the power supplied to the sink network element 106 over the communication medium 106 is the primary power source and the additional power from another power source is a backup source of power. In other embodiments, both the power supplied to the sink network element 104 over the communication medium 106 and the additional power from another power source provide the primary power for the sink network element 104.

The source network element 102 includes a control module 120. Control module 120 implements an algorithm or logic that monitors and controls the supply of power to the sink element 104 (referred to here as the "control algorithm or logic" or just "control algorithm"). In the embodiment shown in FIG. 1, the control module 120 is coupled to the management and control interface 144 over a management and control interface 145. In one embodiment, the control module 120 includes a processor (for example, a microprocessor) that is programmed with appropriate instructions to carry out the control algorithm. The instructions are stored in an appropriate memory from which the processor retrieves the instructions. Memory also includes memory for the storage of data structures used by the instructions to implement the control algorithm. In one embodiment, memory includes a combination of read only memory (ROM), random access memory (RAM), and registers included within the processor. In other embodiments, other types of memory are used. In such an embodiment, the management and control interface 145 includes an appropriate interface for coupling the processor to the management interface 144 (for example, by using a data bus and address bus and/or various control signal lines and associated circuitry).

In the embodiment shown in FIG. 1, in addition to the processor, the instructions, and the memory, the control module 120 includes hardware that implements at least a portion of the control algorithm or logic. The hardware includes, for example, analog and/or digital circuitry. In other embodiments, the control algorithm or logic that monitors and controls the supply of power to the sink element 104 is implemented using only a programmed processor (that is, using software) or using only hardware. In other embodiments, the control algorithm or logic is implemented in other ways.

The sink network element 104 includes a control module 130. Control module 130 implements an algorithm or logic that monitors and controls the receipt of power from the source element 102. In the embodiment shown in FIG. 1, the control module 130 is coupled to the management interface 154 over a management and control interface 157. In one embodiment, the control module 130 includes a processor (for example, a microprocessor) that is programmed with appropriate instructions to carry out the control algorithm. The instructions are stored in an appropriate memory from which the processor retrieves the instructions. Memory also includes memory for the storage of data structures used by the instructions to implement the control algorithm. In one embodiment, memory includes a combination of read only memory (ROM), random access memory (RAM), and registers included within the processor. In other embodiments, other types of memory are used. In such an embodiment, the management and control interface 157 includes an appropriate interface for coupling the processor to the management interface 154 (for example, by using a data bus and address bus and/or various control signal lines and associated circuitry).

In the embodiment shown in FIG. 1, in addition to the processor, the instructions, and the memory, the control module 130 includes hardware that implements at least a portion of the control algorithm or logic. The hardware includes, for example, analog and/or digital circuitry. In other embodiments, the control algorithm or logic that monitors and controls the receipt of power from the source element 102 is implemented using only a programmed processor (that is, using software) or using only hardware. In other embodiments, the control algorithm or logic is implemented in other ways.

Although the control modules 120 and 130 of the source network element 102 and the sink network element 104, respectively, are shown as a single item in FIG. 1, it is to be understood that in various embodiments of the network elements 102 and 104 the functionality of the control modules 120 and 130 is implemented in a single component or distributed across multiple components of the network elements 102 and 104.

In addition, the sink network element 104 includes power storage devices 192 for storing power. In one embodiment, power storage device 192 include appropriate capacitors and other circuit components to store power that can be supplied to the network element 104 to continue operation during brief power interruptions. For example, in one embodiment, the power storage device 192 of sink network element 104 is used to supply power to the sink network element 104 while the source network element 102 is rebooting or is shut off for other reasons.

Examples of a various topologies for networks including line-powered elements are included in the '323 Application.

Figure 2:
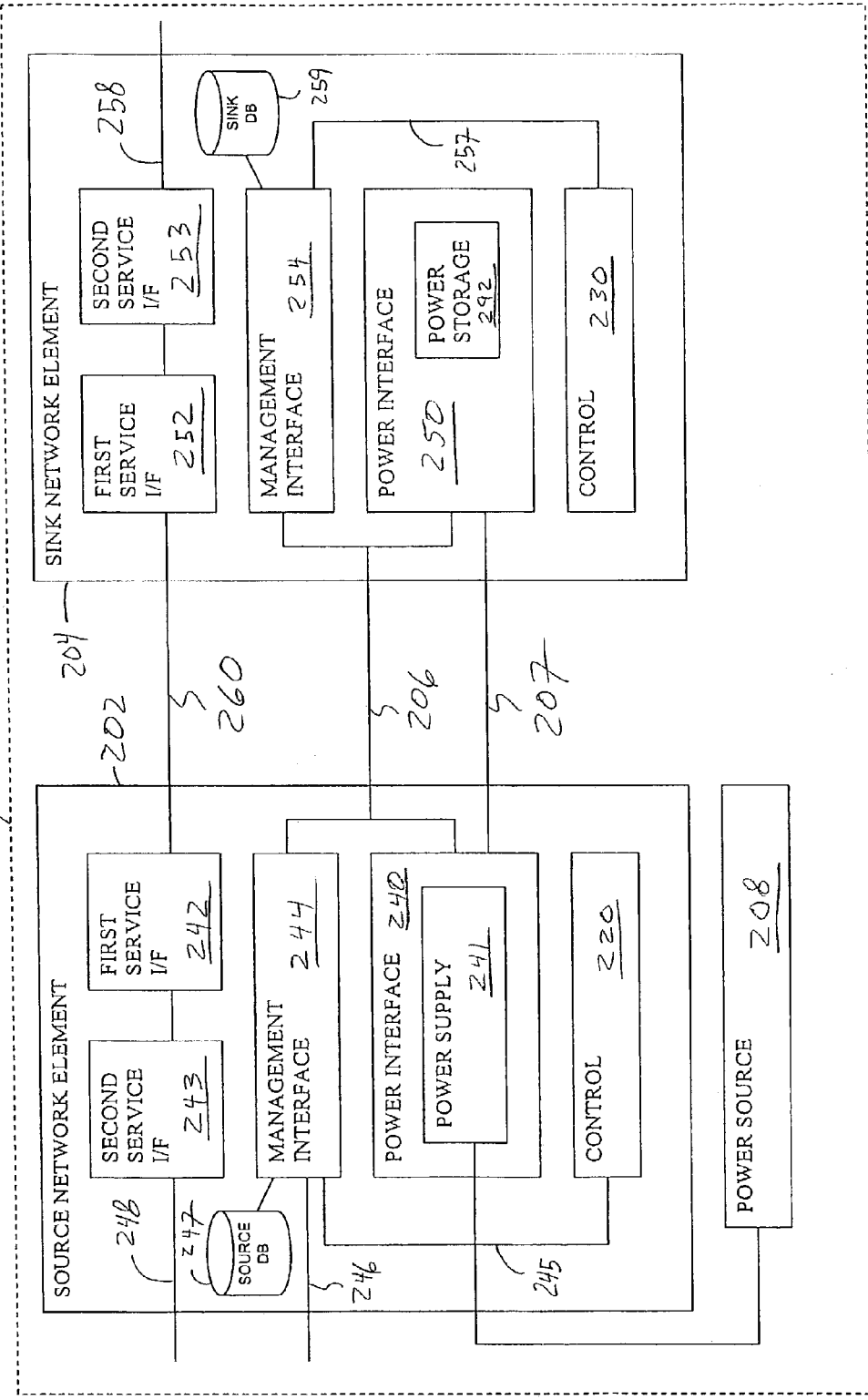
FIG. 2 is a block diagram of a second embodiment of a network including a line powered network element.

FIG. 2 is a block diagram of a second embodiment of a network 200 including a line powered network element. Except as described below, the embodiment shown in FIG. 2 includes the same components described above in connection with the embodiment shown in FIG. 1, which are referenced using the same reference numbers used in FIG. 1 incremented by 100. In the embodiment shown in FIG. 2, the first service interfaces 242 and 252 are coupled to another communication medium 260 (referred to here as the "service communication medium" 260) in order to couple the sink network element 204 to the source network element 202. In such an embodiment, the communication medium 206 (also referred to as a "power communication medium" 206 in the context of this embodiment) is used to supply power from the source network element 202 to the sink network element 204 but does not, in normal operation, provide a telecommunication service.

In one such embodiment, the service communication medium 260 includes, for example, an optical fiber over which a telecommunication service is provided. In other such embodiments, the service communication medium 260 includes, for example, one or more twisted-pair telephone lines providing POTS, DSL, T1, or other telecommunications services, one or coaxial cables or optical fibers providing video, data, and voice services.

Figure 3:
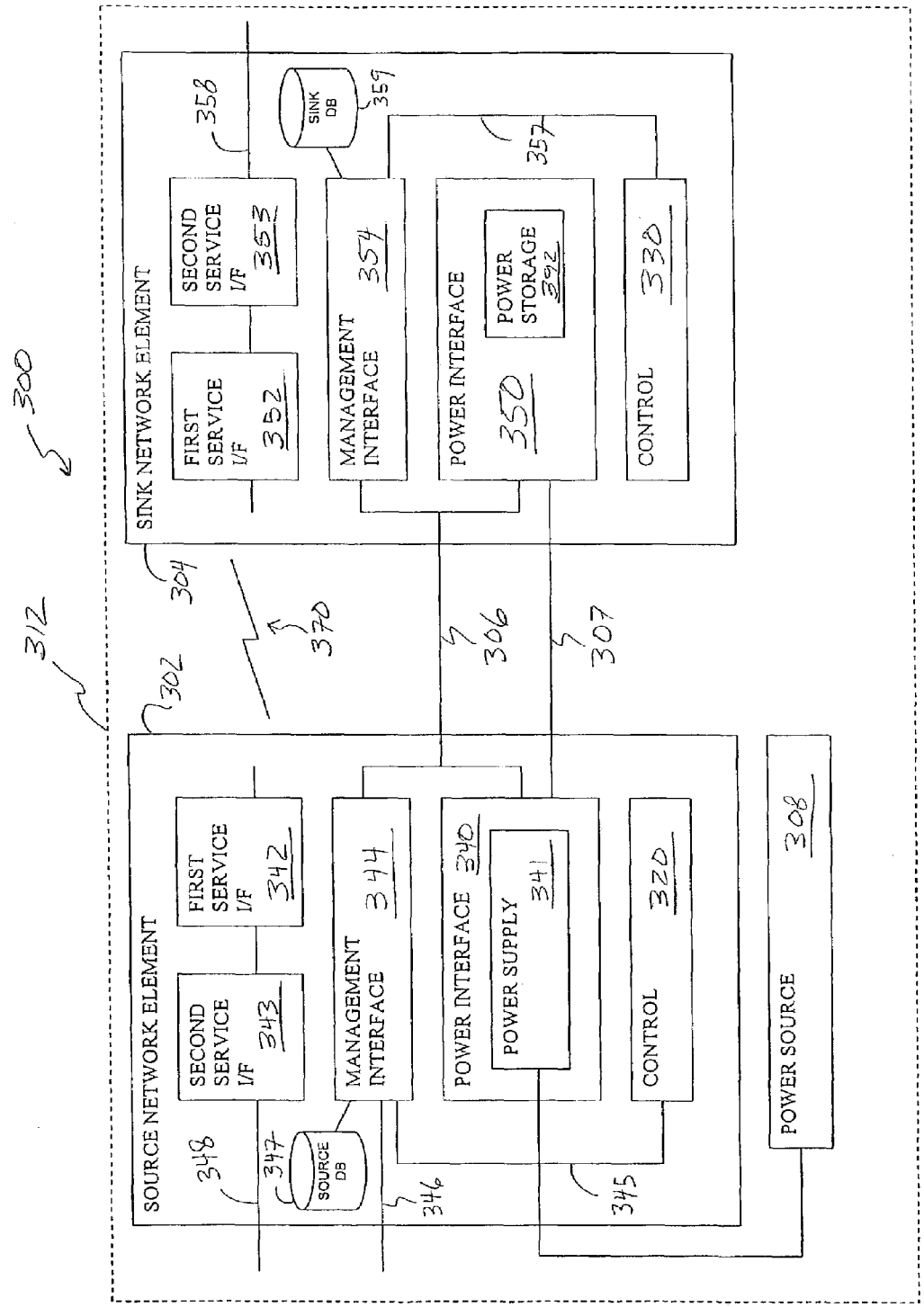
FIG. 3 is a block diagram of a third embodiment of a network including a line powered network element.

FIG. 3 is a block diagram of a third embodiment of a network 300 including a line powered network element. Except as described below, the embodiment shown in FIG. 3 includes the same components described above in connection with the embodiment shown in FIG. 1, which are referenced using the same reference numbers used in FIG. 1 incremented by 200. In the embodiment shown in FIG. 3, the telecommunication service is provided between the source network element 302 and the sink network element 304 over a wireless communication link 370 while power is supplied from the source network element 302 to the sink network element 304 over the power communication medium 306. In one such embodiment, the wireless communication link 370 includes, for example, a point-to-point wireless link such as a microwave link and/or a WI-FI IEEE 802.11 wireless link.

In such an embodiment, a first service interface 342 couples the source network element 302 to the wireless communication link 370 and a first service interface 352 of the sink network element 304 couples the source network element 304 to wireless communication link 370. The first service interface 342 and the first service interface 352 include appropriate functionality (for example, wireless transceivers, filters, amplifiers, etc.) to provide a telecommunication services over the wireless communication link 370.

Figure 4:
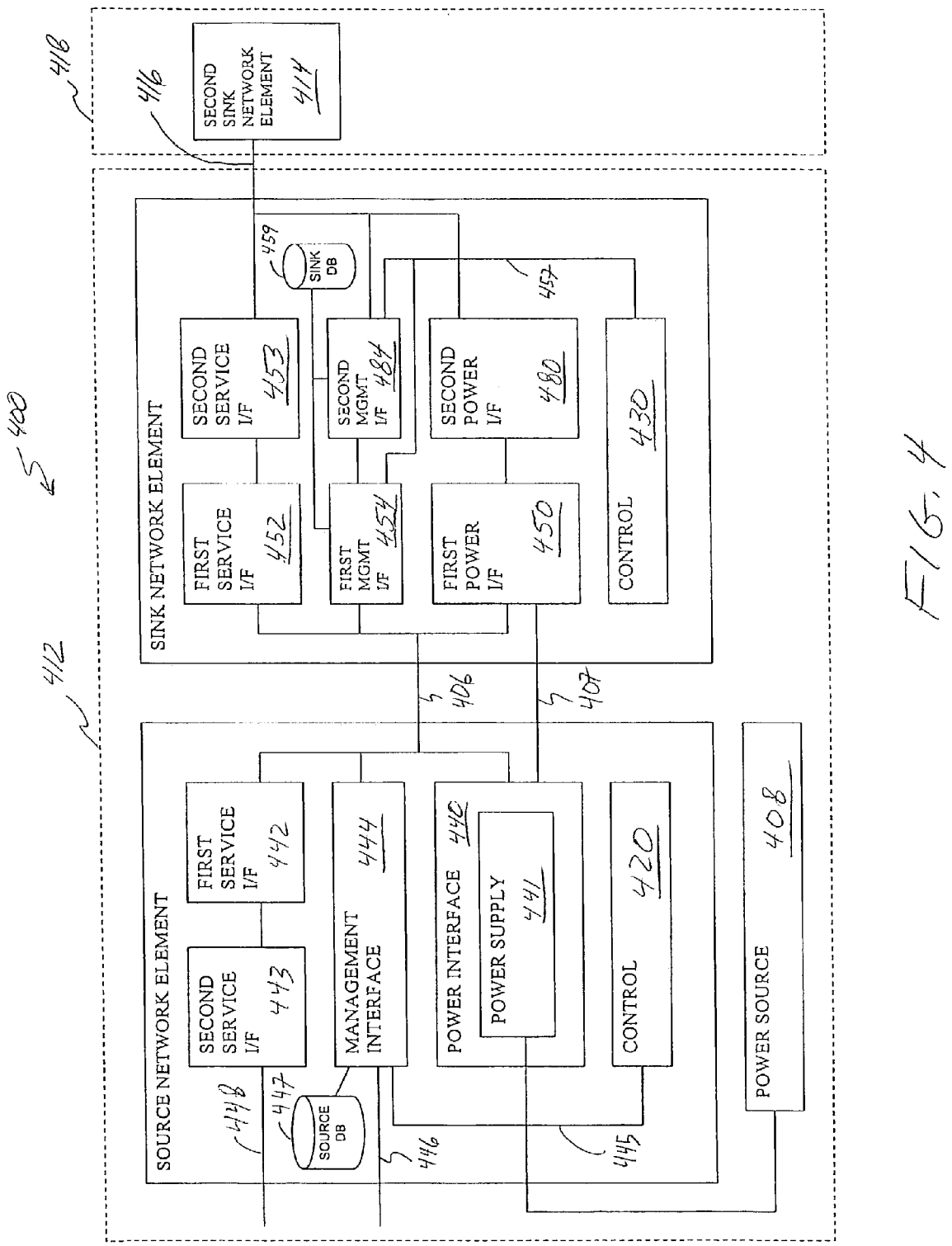
FIG. 4 is a block diagram of a fourth embodiment of a network including a line powered network element.

FIG. 4 is a block diagram of a fourth embodiment of a network 400 including a line powered network element. Except as described below, the embodiment shown in FIG. 4 includes the same components described above in connection with the embodiment shown in FIG. 1, which are referenced using the same reference numbers used in FIG. 1 incremented by 300. In the embodiment shown in FIG. 4, a sink network element 404 (also referred to here as a "first sink network element" 404 or "repeater network element" 404) acts as a repeater and provides power to a second sink network element 414 over a second communication medium 416.

The second sink network element 414, in the embodiment shown in FIG. 4, is located at customer premises 418 and is also referred to as customer located equipment (CLE). Examples of such customer located equipment include modems, wireless access points, hubs, telephones, fax machines, and computers. In other embodiments, the second sink network element 414 is also located in the access network 412.

The first sink network element 404 includes a second power interface 480 and a second management interface 484. The second power interface 480 receives power from the power interface 450 and applies the power to the second communication medium 416 (also referred to here as a "second power communication medium" 416). Typically, the second power communication medium 416 includes a conductive medium (for example, one or more copper wires) over which power from the first sink network element 404 is supplied to the second sink network element 414. The second management interface 484 is coupled to the control module 430 over a management and control interface 467.

The second sink network element 414 includes a power interface, service interface, management interface, and control module of the same general type as described above in connection with the sink network element 104 shown in FIG. 1.

In the embodiment shown in FIG. 4, the second power interface 480 and the second service interface 453 of the first sink network element 404 are coupled to the second communication medium 416. Likewise, the power interface and the service interface of the second sink network element 414 are also coupled to the second communication medium 416. In such an embodiment, the second communication medium 416 is used to provide a telecommunication service between the first sink network element 404 and the second sink network element 414 in addition to supplying power from the first sink network element 404 to the second sink network element 414. For example, in one such embodiment, the second communication medium 416 includes one or more twisted-pair telephone lines that provide plain old telephone service and/or digital subscriber line service. In addition, in the embodiment shown in FIG. 4, the second management interface 484 of the first sink network element 404 is coupled to the management interface of the second source network element 414 over the second communication medium 416. For example, in one such an embodiment, management data is included in the telecommunication service traffic transferred over the second communication medium 416, for example, in a special channel included in the data traffic.

Figure 5:
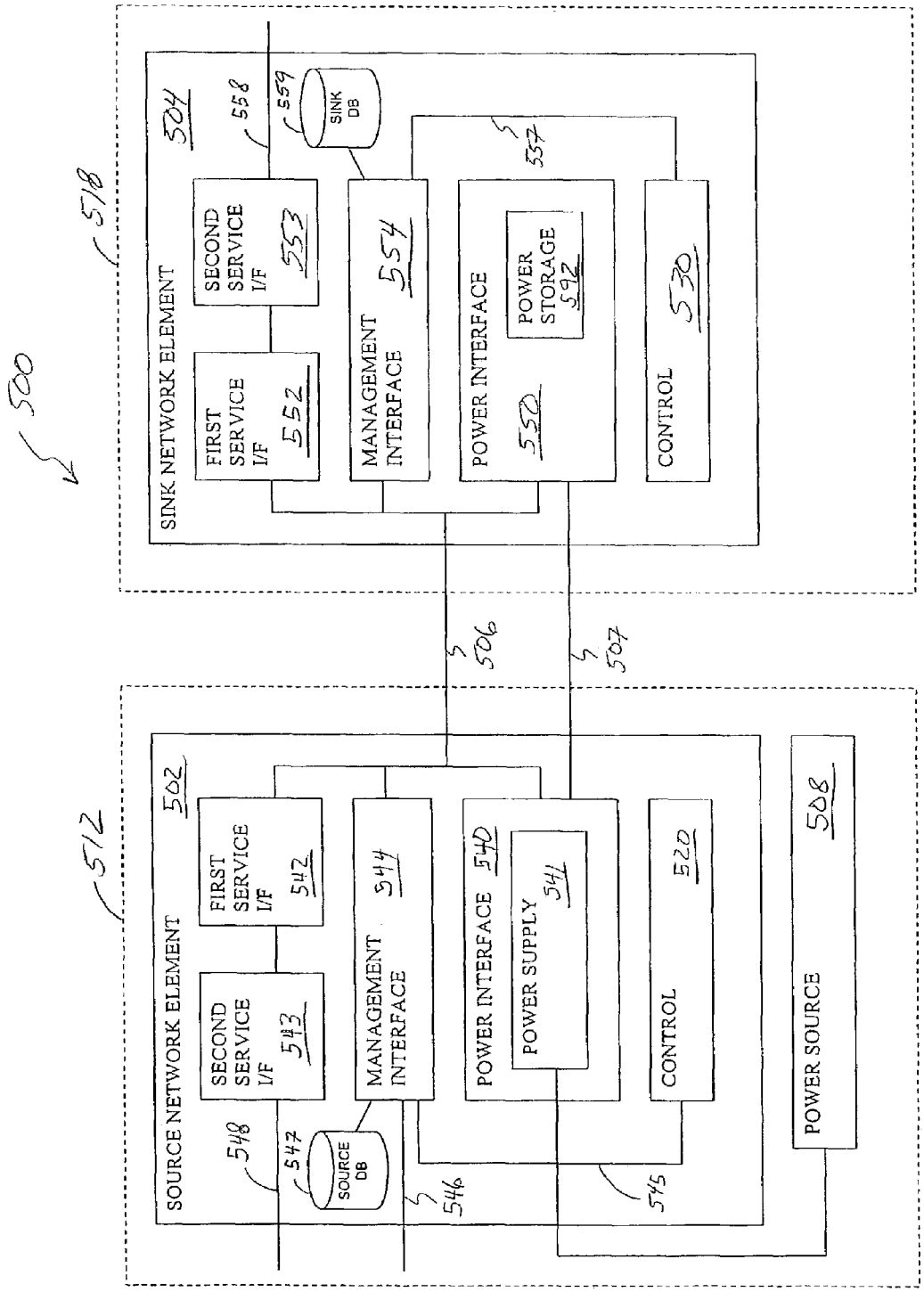
FIG. 5 is a block diagram of a fifth embodiment of a network including a line powered network element.

FIG. 5 is a block diagram of a fifth embodiment of a network 500 including a line powered network element. Except as described below, the embodiment shown in FIG. 5 includes the same components described above in connection with the embodiment shown in FIG. 1, which are referenced using the same reference numbers used in FIG. 1 incremented by 400. In the embodiment shown in FIG. 5, a sink network element 504 is located in the customer premises 518 of the network 500. In other words, the sink network element 504 is customer located equipment in the embodiment shown in FIG. 5.

Figure 6:
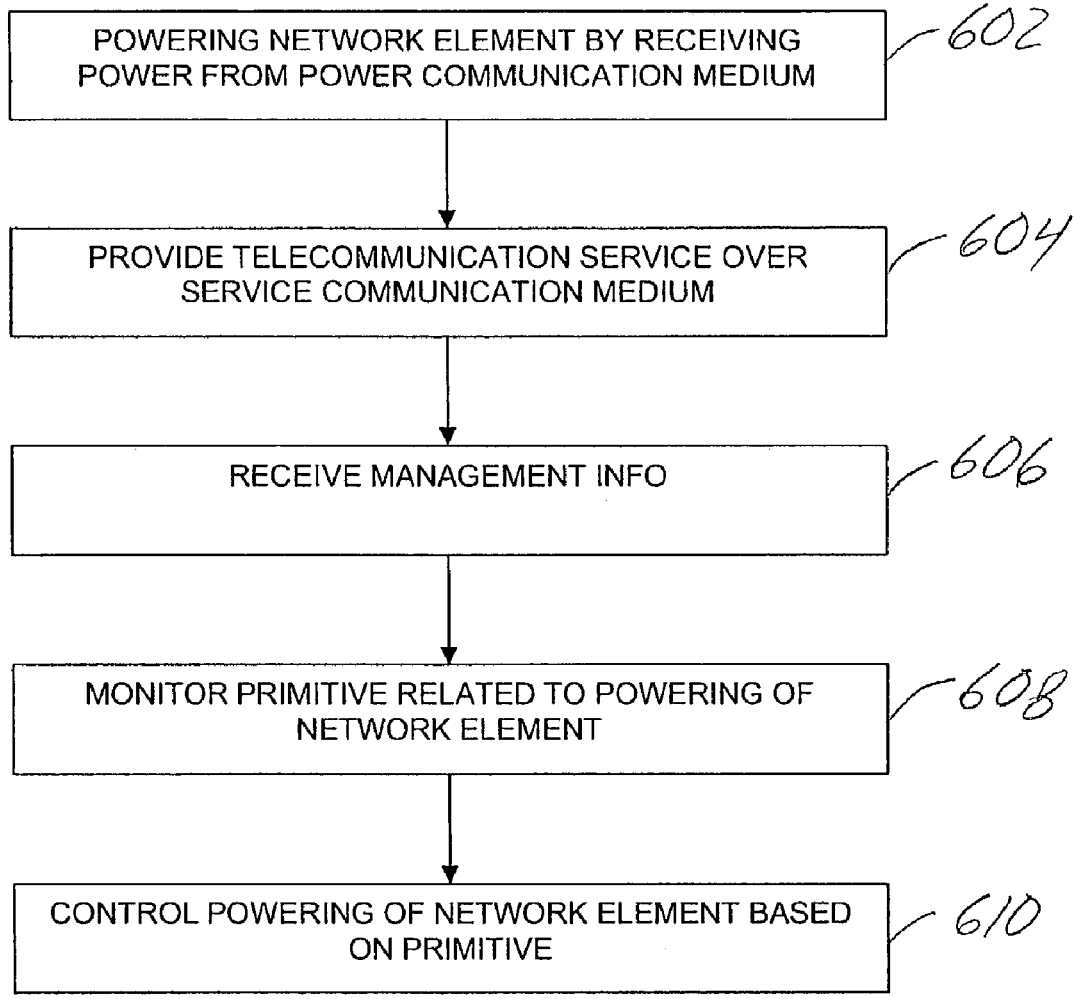
FIG. 6 is a flow diagram of one embodiment of a method of controlling power in a network element.

FIG. 6 is a flow diagram of one embodiment of a method 600 of controlling power in a network element. Embodiments of method 600 are suitable for use as the control algorithm or logic implemented by a control module of a sink network element (for example, sink network element 104 shown in FIG. 1). In one embodiment, the network element is located in an access network, for example, in a central office, head end, or similar location. In one such embodiment, the network element is implemented as a central office terminal located in a central office. In other embodiments, the network element is located in an access network in the outside plant. In one such embodiment, the network element is implemented as a remote terminal having, for example, an environmentally hardened enclosure. In yet another embodiment, the network element is located at a customer premises and is located, for example, in an enterprise or home network. In one such embodiment, the network element is implemented as a modem that is coupled to an access network.

The embodiment of method 600 shown in FIG. 6 includes powering the network element by receiving power from a power communication medium (block 602) and providing a telecommunication service over a service communication medium (block 604). Examples of telecommunication services include voice, video, and data services provided over twisted-pair telephone lines, optical fibers, and/or coaxial cable. In one embodiment, the power communication medium and the service communication medium are included in the same communication medium (as is shown in FIG. 1, for example). For example, in one such embodiment, DSL service (for example, HDSL, HDSL2, HDSL4, or G.SHDSL service) is provided over one or more twisted-pair telephone lines, one or more of which are also used to supply power to the network element.

In another embodiment, the power communication medium and the service communication medium are included in separate communication media (for example, as is shown in FIG. 2). For example, in one such embodiment, DSL service (for example, HDSL, HDSL2, HDSL4, or G.SHDSL service) is provided over one or more twisted-pair telephone lines and one or more other twisted-pair telephone lines are used to supply power to the network element.

In the embodiment shown in FIG. 6, method 600 further includes receiving management information (block 606). In one such embodiment, at least a portion of the management information is received from the sink network element 104 over a management communication. In one embodiment, the management communication medium and the service communication medium are included in the same communication medium (for example, as is shown in FIG. 1). In one embodiment, the management information includes primitives that are exchanged between a source network element and a sink network element and/or between the network element and another device such as an element management system. The primitives are stored, for example, in the source database 147 described above for later reference in monitoring and/or control operations.

Method 600 also includes monitoring a primitive related to the powering of the network element (block 608) and controlling the powering of the network element based on the primitive (block 610). Examples of primitives and how they can be used to control the power of the network element are described below.

Figure 7:
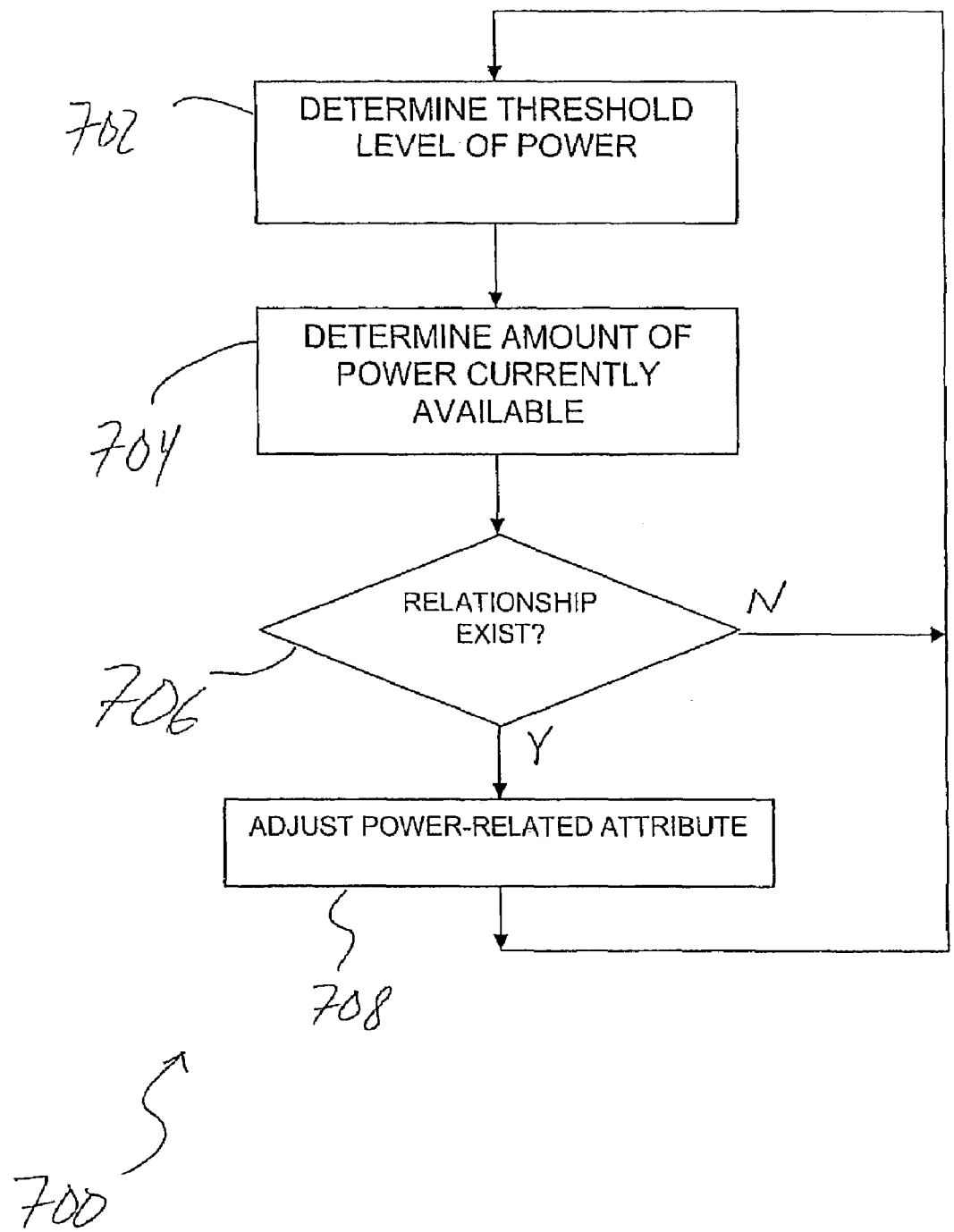
FIG. 7 is a block diagram of one embodiment of a method of monitoring a primitive related to the powering of the network element and controlling the powering of the network element based on the primitive.

FIG. 7 is a block diagram of one embodiment of a method 700 of monitoring a primitive related to the powering of the network element and controlling the powering of the network element based on the primitive. Embodiments of method 700 are suitable for use with embodiments of method 600 and embodiments of network elements described in connection with FIG. 6. Method 700 includes determining a threshold level of power (block 702). For example, in one such embodiment, this threshold is the amount of power needed by the network element to provide a given set of telecommunication services at a given service level. In one such embodiment, the needed power for a given set of telecommunication services at a given service level is set when the network element is provisioned to provide the set of telecommunication services at that service level. The need power value, in such an embodiment, is supplied, for example, directly or indirectly from an element management system or by a technician interacting with the network element via a craft port.

In other embodiments, this threshold level of power is determined dynamically during operation of the network element based on various operational parameters of the network element. The various operation parameters can be retrieved using one or more primitives. For example, in one such embodiment, the amount of power needed by the network element to provide a given set of telecommunication services at a given service level is measured when the network element is able to successfully provide the set of telecommunication services at the given service level. The measured power level is stored (for example, in a memory) for subsequent use or is communicated to another device via a primitive.

The amount of power currently available for use by the network element is determined (block 704). Such a determination, in one embodiment, is made by measuring one or more power-related attributes (for example, the current and/or voltage supplied by the power communication medium) and calculating the power supplied by the power communication medium. In other embodiments, such a determination is made in other ways.

If a predetermined relationship exists between the threshold level and the amount of power currently available (checked in block 706), a power-related attribute of the network element is adjusted (block 708). The predetermined relationship between the threshold level and the amount of power currently available is one or more of the following: the threshold level is less than the currently available power, the threshold level is equal to the currently available power, or the threshold level is greater than the currently available power. In one embodiment, such a relationship is characterized by the difference between the amount of power currently available and the amount of power needed by the network element to provide a set of telecommunication services at a given service level (that is, one type of threshold value). This difference is referred to here as the "power headroom."

For example, in one embodiment, if the amount of power currently available for use by the network element is less than the threshold value, then one or more power save functions are invoked. Such power save functions include, for example, operating at least a portion of the network element in a low-power mode in which, for example, one or more telecommunication services provided by the network element are provided at a reduced service level and/or at least a portion of the network element is operated at a lower clock rate. In one such embodiment where voice and data telecommunication services are provided by the network element, the data telecommunication services are assigned a lower priority and the service level at which at least one data telecommunication service is provided is reduced in such a low-power mode.

In other embodiments, such power save functions includes stopping the functioning of at least a portion of the network element. For example, in one such embodiment, one or more telecommunication services typically provided by the network element are stopped. That is, those telecommunication services are no longer provided by the network element while the power save function is invoked. In one such embodiment where voice and data telecommunication services are provided by the network element, the data telecommunication services are assigned a lower priority and at least one data telecommunication service is stopped when such a power save function is invoked.

Such power saved functions, in one embodiment, are invoked iteratively with increasing levels of power reduction. For example, in such an embodiment, initially, the service level at which one or more telecommunication service are provided is reduced by a relatively small amount. Then method 700 is repeated to determine if the currently available power is less than or equal to the power needed to provide the current set of telecommunication service (which includes the reduced telecommunication service). If not, then additional power save functions are invoked.

In one embodiment, if the amount of power currently available is greater than the threshold value, then the way in which the telecommunication services are provided and/or the way in which the network element is powered is improved. For example, in one embodiment, if the amount of power currently available is greater than the power needed to provide the current set of telecommunication services at the current service level, then additional telecommunication services are provided (for example, those telecommunication services that were stopped during a previous power save function) and/or telecommunication services are provided at a higher service level (for example those telecommunication services that were provided at a reduced service level during a power save function are increased to their "full" service level). In one such embodiment, higher priority telecommunication services (for example, voice telecommunication services) are restored before lower priority telecommunication services (for example, data telecommunication services).

In other embodiments, the way in which the network element is powered is improved, for example, by improving the power transfer efficiency of the power communication medium or the power dissipated in the power communication medium. In other embodiments, improving the way in which the network element is powered includes storing power in a power storage device (for example, power storage device 190 shown in FIG. 1) for later use in powering the network element.

Figure 8:
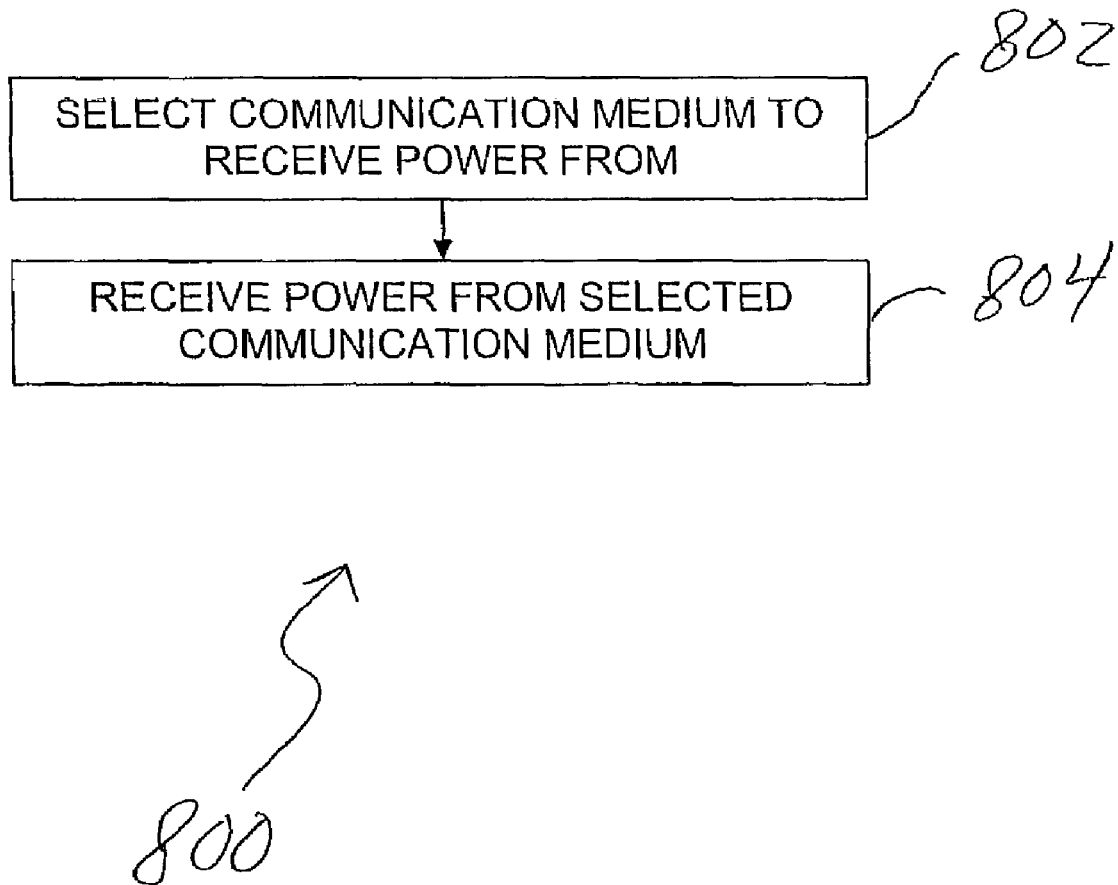
FIG. 8 is a block diagram of one embodiment of a method of monitoring a primitive related to the powering of a network element and controlling the powering of a network element based on the primitive.

FIG. 8 is a block diagram of one embodiment of a method 800 of monitoring a primitive related to the powering of a network element and controlling the powering of a network element based on the primitive. Embodiments of method 800 are suitable for use with embodiments of method 600 and embodiments of network elements described in connection with FIG. 6. Method 800 includes selecting from a plurality of communication media at least one communication medium to receive power from (block 802). Method 800 also includes receiving power from the selected communication medium (block 804).

For example, where the network element is coupled to several communication media (for example, multiple twisted-pair telephone lines), selecting the at least one communication medium to receive power from includes determining which communication media are able to supply power and selecting the at least one communication medium from the subset of communication media that are able to supply power to the network element. For example, a particular telecommunication service that is provided on a particular communication medium may preclude that communication medium from supplying power.

In one embodiment, this selection is made using a primitive in which the selected communication medium or media are identified. The primitive is communicated to the network element, for example, from an element management application or from a technician interacting with the network element using a craft port. In other embodiments, the selection of the at least one communication medium occurs during a boot up process of the network element based on the condition of each of a set of communication media that could potentially be used to receive power. The condition of each of the set of communication media is indicated by or determined using one more primitives.

In another embodiment, the selection of the at least one communication medium occurs during normal operation when one or more communication media that were previously supplying power are unable to continue to supply power to the network element. In other words, this selection of a new communication medium from which the network element receives power is a part of a protection switching operation in which a selected communication medium is used to supply power to the network element in place of, or in addition to, a failed communication medium.

Figure 9:
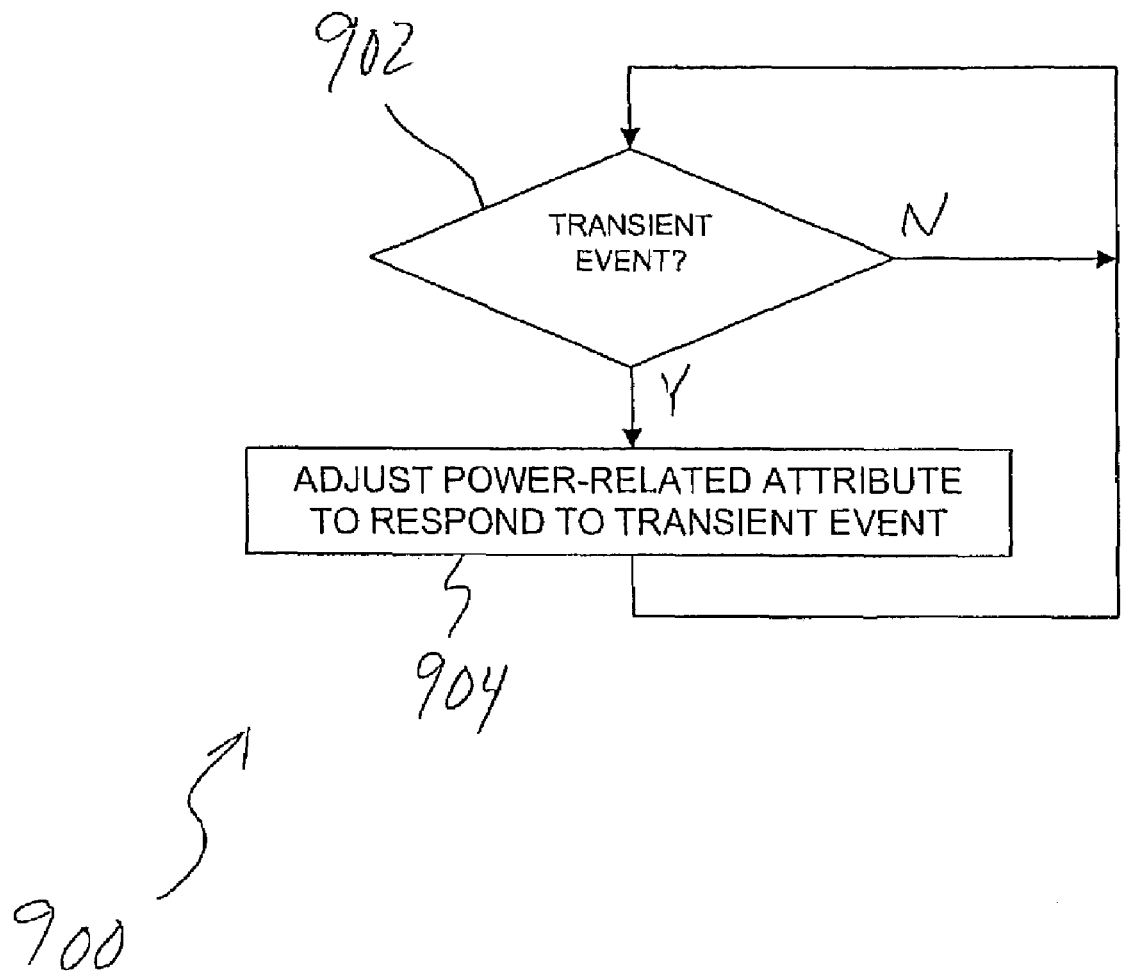
FIG. 9 is a flow diagram of one embodiment of a method of monitoring a primitive related to the powering of a network element and controlling the powering of a network element based on the primitive.

FIG. 9 is a flow diagram of one embodiment of a method 900 of monitoring a primitive related to the powering of a network element and controlling the powering of a network element based on the primitive. Embodiments of method 900 are suitable for use with embodiments of method 600 and embodiments of network elements described in connection with FIG. 6. Method 900 includes determining if a transient event has occurred based on one or more primitives (block 902). When a transient event occurs, at least one power related attribute of the network element is adjusted to respond to the transient event (904). Examples of transient events include impulse transients (for example, resulting from power surges) and interruption of the supply of power to the network element over the power communication medium.

In one embodiment, the transient event is an impulse transient event resulting from, for example, a power surge or other sudden change in the voltage or current supplied on the power communication medium. Such a transient event is detected by detecting when the rate of change of a power-related attribute (for example, voltage or current) changes at rate greater than a threshold rate of change and/or when a power-related attribute exceeds some threshold value. When such an impulse transient is detected, the impulse transient is filtered by limiting the rate of change of the power-related attribute and/or activating one or more protection devices. In some embodiment, filtering reduces the occurrence or impact of negative effects that result from such impulse transients.

In another embodiment, the transient event is an interruption of the supply of power to the network element over the power communication medium. This is detected when power is not received on the power communication medium for a specified amount of time. For example, power will not be supplied on the power communication medium when a source network element is rebooted. When power is not received on the power communication medium for a specified amount of time, power is supplied to the network element from a secondary power source such as a local power source, additional power communication media, or power storage device (for example, power storage device 192 shown in FIG. 1). This allows the network element to continue functioning during the interruption.

Figure 10:
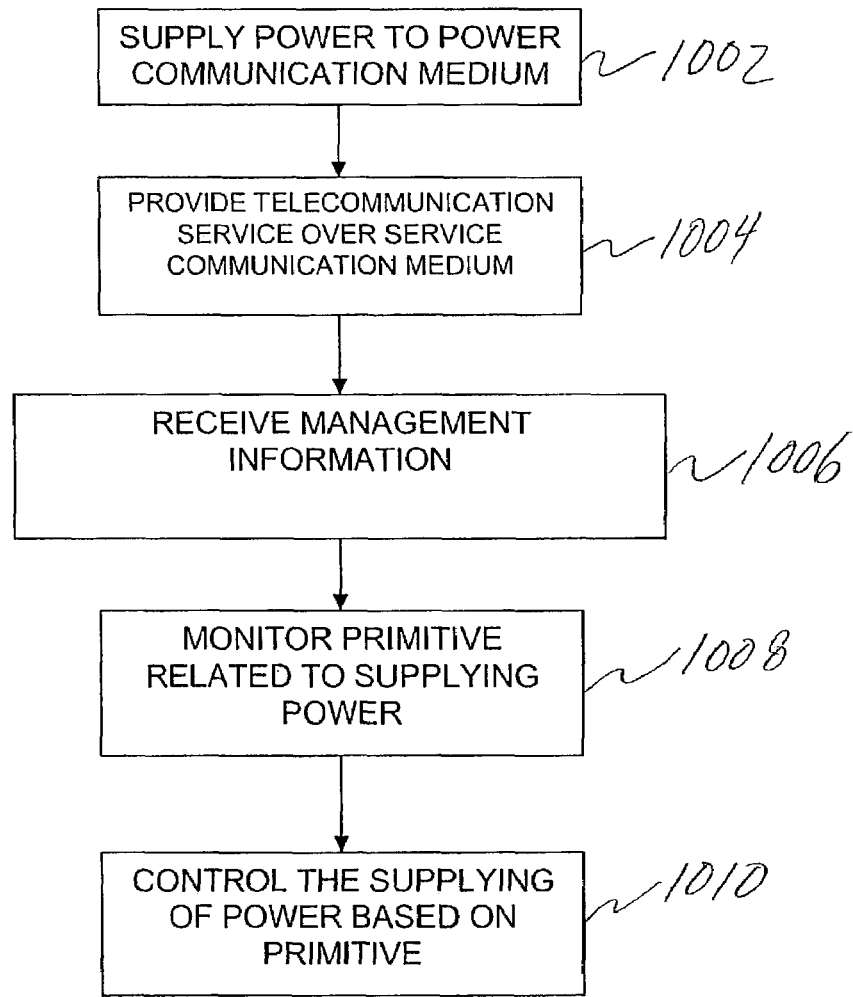
FIG. 10 is a flow diagram of one embodiment of a method of controlling power in a network element.

FIG. 10 is a flow diagram of one embodiment of a method 1000 of controlling power in a network element. Embodiments of method 1000 are suitable for use as the control algorithm or logic implemented by a control module of a source network element (for example, source network element 104 shown in FIG. 1). In one embodiment of method 1000, the network element is located in an access network, for example, in a central office, head end, or similar location. In one such embodiment, the network element is implemented as a central office terminal located in a central office. In other embodiments, the network element is located in an access network in the outside plant. In one such embodiment, the network element is implemented as a remote terminal having, for example, an environmentally hardened enclosure. In such an embodiment, the remote terminal acts as a repeater and supplies power to a sink network element. In yet another embodiment, the source network element is located at a customer premises and is located, for example, in an enterprise or home network. In one such embodiment, the network element is implemented as a modem that is coupled to an access network. In such an embodiment, the network element provides power to other network elements located in the enterprise or home network.

The embodiment of method 1000 shown in FIG. 10 includes supplying power to the power communication medium (block 1002). This is done to power at least one sink network element. Method 1000 also includes providing a telecommunication service over a service communication medium (block 1004). Examples of telecommunication services include voice, video, and data services provided over twisted-pair telephone lines, optical fibers, and/or coaxial cable. In one embodiment, the power communication medium and the service communication medium are included in the same communication medium (as is shown in FIG. 1, for example). For example, in one such embodiment, DSL service (for example, HDSL, HDSL2, HDSL4, or G.SHDSL service) is provided over one or more twisted-pair telephone lines, one or more of which the network element applies power to.

In another embodiment, the power communication medium and the service communication medium are included in separate communication media (for example, as is shown in FIG. 2). For example, in one such embodiment, DSL service (for example, HDSL, HDSL2, HDSL4, or G.SHDSL service) is provided over one or more twisted-pair telephone lines and the network element applies power to one or more other twisted-pair telephone lines.

In the embodiment shown in FIG. 10, method 1000 further includes receiving management information (block 1006). In one such embodiment, at least a portion of the management information is received from the source network element over the management communication medium. In one embodiment, the management communication medium and the service communication medium are included in the same communication medium (for example, as is shown in FIG. 1). In one embodiment, the management information includes primitives that are exchanged between a source network element and a sink network element and/or between the network element and another device such as an element management system. The primitives are stored, for example, in the sink database 159 described above for later reference in monitoring and/or control operations.

Method 1000 also includes monitoring a primitive related to supplying power to the power communication medium (block 1008) and controlling the supply of power to the power communication medium based on the primitive (block 1010). Examples of primitives and how they can be used to control the supply of power to the power communication medium are described below.

Figure 11:
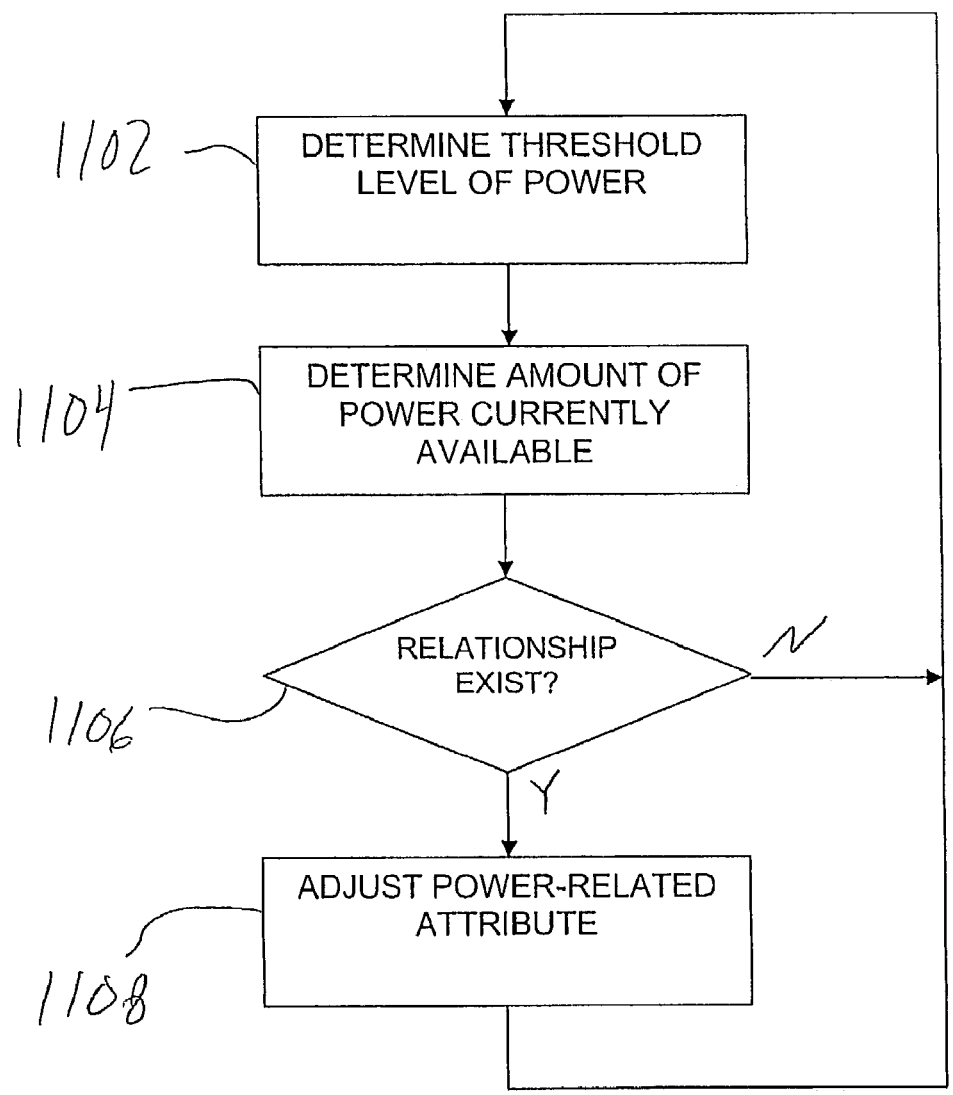
FIG. 11 is a flow diagram of one embodiment of a method of monitoring a primitive related to supplying power to a power communication medium and controlling the supply of power to the power communication medium based on the primitive.

FIG. 11 is a flow diagram of one embodiment of a method 1100 of monitoring a primitive related to supplying power to a power communication medium and controlling the supply of power to the power communication medium based on the primitive. Embodiments of method 1100 are suitable for use with embodiments of method 1000 and embodiments of network elements described in connection with FIG. 10. Method 1100 includes determining a threshold level of power (block 1102). For example, in one such embodiment, this threshold level is the amount of power needed to supply power to the power communication medium at a predetermined maximum power level. This predetermined maximum level, in one such embodiment, is determined by an applicable standard related to providing power over a particular type of communication medium. Such a standard typically sets a maximum power that can be supplied over such a communication medium. In one implementation of such an embodiment, the threshold value is set so as to correspond to a maximum power level that is less than the maximum power specified by such a standard. For example, where the standard specifies a maximum power of 100 watts, in one such embodiment, the threshold value is set to 95 watts.

In another embodiment, this threshold value is the amount of power needed by the network element in order to provide enough power on the power communication medium to power a sink network element that is providing a given set of telecommunication services at a given service level. In one embodiment, the needed power for the given set of telecommunication services at the given service level is set when the sink network element is provisioned to provide the set of telecommunication services at that the given service level. The need power value, in such an embodiment, is supplied to the source network element, for example, directly or indirectly from an element management system or by a technician interacting with the network element via a craft port.

In other embodiments, this threshold level of power is determined dynamically during operation of the network element based on various operational parameters of the network element. For example, in one such embodiment, the amount of power needed by the sink network element to provide a given set of telecommunication services at a given service level is measured when the sink network element is able to successfully provide the set of telecommunication services at the given service level. The measured power level is stored (for example, in a memory) for subsequent use or communicated to another device via a primitive.

The amount of power currently available to be supplied to the power communication medium by the network element is determined (block 1104). Such a determination, in one embodiment, is made by measuring one or more power-related attributes (for example, the current and/or voltage supplied by a power source coupled to the network element) and calculating the power currently available to be supplied to the power communication medium. For example, in one embodiment, primitives are used that contain information related to the state of the power source from which the network element receives power. In other embodiments, such a determination is made in other ways.

If a predetermined relationship exists between the threshold level and the power currently available to be supplied to the power communication medium (checked in block 1106), a power-related attribute of the network element is adjusted (block 1108). The predetermined relationship between the threshold level and the power currently available to be supplied to the power communication medium is at least one of the following: the threshold level is less than the power currently available to be supplied, the threshold level is equal to the power currently available to be supplied, or the threshold level is greater than the power currently available to be supplied.

For example, in one embodiment, where the threshold level is the amount of power needed to supply power to the power communication medium at a predetermined maximum power level, if the amount of power currently available for use by the network element is less than the threshold level, then one or more power save functions are invoked by the source network element. Such power save functions include, for example, operating at least a portion of the network element in a low-power mode in which, for example, the amount of power supplied on the power communication medium is reduced, one or more telecommunication services provided by the network element are provided at a reduced service level, and/or at least a portion of the network element is operated at a lower clock rate. In one such embodiment where voice and data telecommunication services are provided by the network element, the data telecommunication services are assigned a lower priority and the service level at which at least one data telecommunication service is provided is reduced in such a low-power mode.

In other embodiments, such power save functions includes stopping the functioning of at least a portion of the network element. For example, in one such embodiment, one or more telecommunication services typically provided by the network element are stopped. That is, those telecommunication services are no longer provided by the network element while the power save function is invoked. In one such embodiment where voice and data telecommunication services are provided by the network element, the data telecommunication services are assigned a lower priority and at least one data telecommunication service is stopped when such a power save function is invoked.

Such power saved functions, in one embodiment, are invoked iteratively with increasing levels of power reduction. For example, in such an embodiment, initially, the service level at which one or more telecommunication service are provided is reduced by a relatively small amount. Then method 1100 is repeated to determine if the currently available power is less than the threshold level. If it is, then additional power save functions are invoked (for example, stopping telecommunications and reducing the power supplied on the power communication medium).

An example of when such power save functions may be invoked is when the power source that is used to supply power to the source network element is impaired. For example, where a main power source is unable to supply power, a battery backup power source may be used. In one such embodiment, the battery backup power source may provide a reduced amount power. Such a reduce amount of power may be suitable for powering some telecommunications services (for example, lifeline voice telecommunication services) but not others (for example, data telecommunications services). In such an embodiment, when the network element determines that the backup power source is used or causes the backup power source to be used (for example, via primitive), one or more power save functions are invoked such as reducing or stopping data telecommunication services and/or operating at least a portion of the network element in a low-power mode.

In another one embodiment, if the amount of power currently available is greater than the threshold level, then the amount of power supplied to the power communication medium is increased and/or the way in which the telecommunication services are provided is improved. For example, in one embodiment, if the amount of power currently available is greater than the threshold level, the power level supplied to the power communication medium is increased (for example, up to the predetermined maximum power level), additional telecommunication services are provided (for example, those telecommunication services that were stopped during a previous power save function) and/or telecommunication services are provided at a higher service level (for example those telecommunication services that were provided at a reduced service level during a power save function are increased to their "full" service level). In one such embodiment, higher priority telecommunication services (for example, voice telecommunication services) are restored before lower priority telecommunication services (for example, data telecommunication services).

In other embodiments, the way in which the network element is powered is improved, for example, by improving the power transfer efficiency of the power communication medium or reducing the power dissipated in the power communication medium. In one such embodiment, a power supply used in the network element is calibrated in order to determine which output voltage levels achieve optimal power transfer efficiency or power dissipation in the power communication medium. These calibrated output voltage levels, in one embodiment, are supplied and/or maintained using a primitive. During operation of the network element, the output voltage applied to the power communication medium, in one such embodiment, is adjusted dynamically based on one or more power-related attributes (for example, the output power supplied on the power communication medium).

Figure 12:
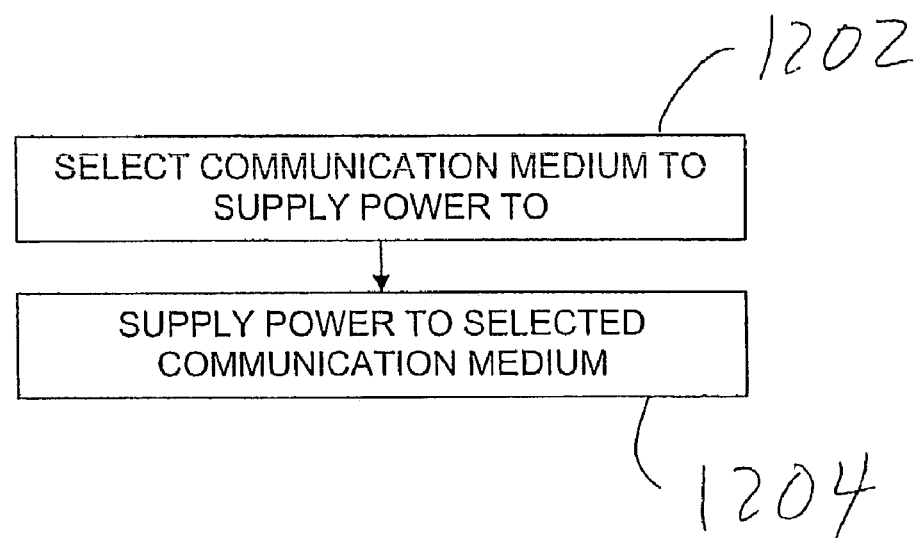
FIG. 12 is a flow diagram of one embodiment of a method of monitoring a primitive related to supplying power to a power communication medium and controlling the supply of power to the power communication medium based on the primitive.

FIG. 12 is a flow diagram of one embodiment of a method 1200 of monitoring a primitive related to supplying power to a power communication medium and controlling the supply of power to the power communication medium based on the primitive. Embodiments of method 1100 are suitable for use with embodiments of method 1000 and embodiments of network elements described in connection with FIG. 10. Method 1200 includes selecting from a plurality of communication media at least one of communication medium on which power is to be supplied (block 1202). Method 800 also includes supplying power on the selected communication medium (block 804).

For example, where the network element is coupled to several communication media (for example, multiple twisted-pair telephone lines), selecting the at least one communication medium on which power is to be supplied includes determining which communication media are suitable for supplying power and selecting the at least one communication medium from the subset of communication media that are suitable for supplying power. For example, a particular telecommunication service that is provided on a particular communication medium may preclude that communication medium from be used to supply power.

In one embodiment, this selection is made using a primitive in which the selected communication medium or media are identified. The primitive is communicated to the network element, for example, from an element management application or from a technician interacting with the network element using a craft port. In other embodiments, the selection of the at least one communication medium occurs during a boot up process of the network element based on the condition of each of a set of communication media that could potentially be used. The condition of each of the set of communication media is indicated by one more primitives.

In another embodiment, the selection of the at least one communication medium occurs during a normal operation when one or more communication media that were previously supplying power are unable to continue to supply power. In other words, this selection of a new communication medium on which the network element supplies power is a part of a protection switching operation in which a selected communication medium is used to supply power in place of, or in addition to, a failed communication medium.

In other embodiments, each of the plurality of communication media is profiled. Profiling can also be used to determine what type of load is coupled to the communication media (for example, a static DC load and/or dynamic load). Such profiling can occur during a boot-up procedure performed by a power supply included in the source network element. Profiling can also include determining the suitability or expected performance of each communication medium for providing various telecommunication services. For example, in one such approach, time domain reflectometry (TDR) is used in for such profiling.

Figure 13:
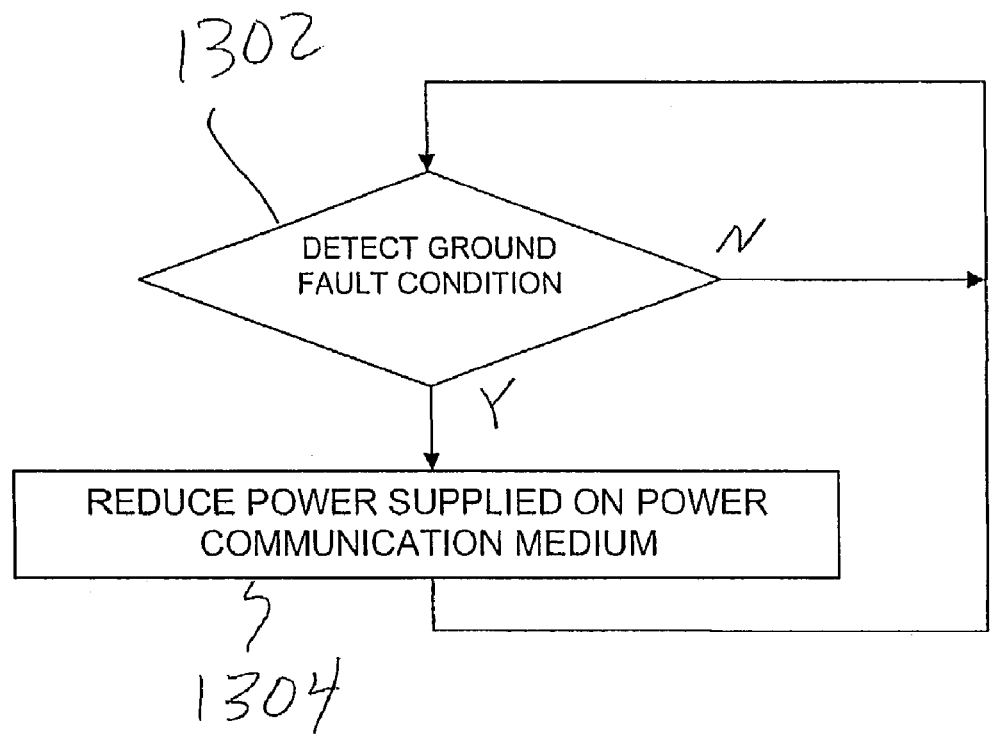
FIG. 13 is a flow diagram of one embodiment of a method of monitoring a primitive related to the supplying power to a power communication medium and controlling the supply of power to the power communication medium based on the primitive.

FIG. 13 is a flow diagram of one embodiment of a method 1300 of monitoring a primitive related to the supplying power to a power communication medium and controlling the supply of power to the power communication medium based on the primitive. Embodiments of method 1300 are suitable for use with embodiments of method 1000 and embodiments of network elements described in connection with FIG. 10. Method 1300 includes detecting a ground fault condition (block 1302) and when a ground fault condition is detected, reducing the power supplied on the power communication medium (block 1304).

In one such embodiment, a ground fault is detected by analyzing the current and/or voltage being supplied on the power communication medium. Such a determination may distinguish between other power related conditions based on amount, rate of change, or other attribute of the current and/or voltage supplied on the power communication medium. In such an embodiment, reducing the power supplied on the power communication medium includes, for example, reducing the output voltage supplied of a power supply used to supply power on the power communication medium. In one embodiment, no power is supplied on the power communication medium when a ground fault condition is detected.

Figure 14:
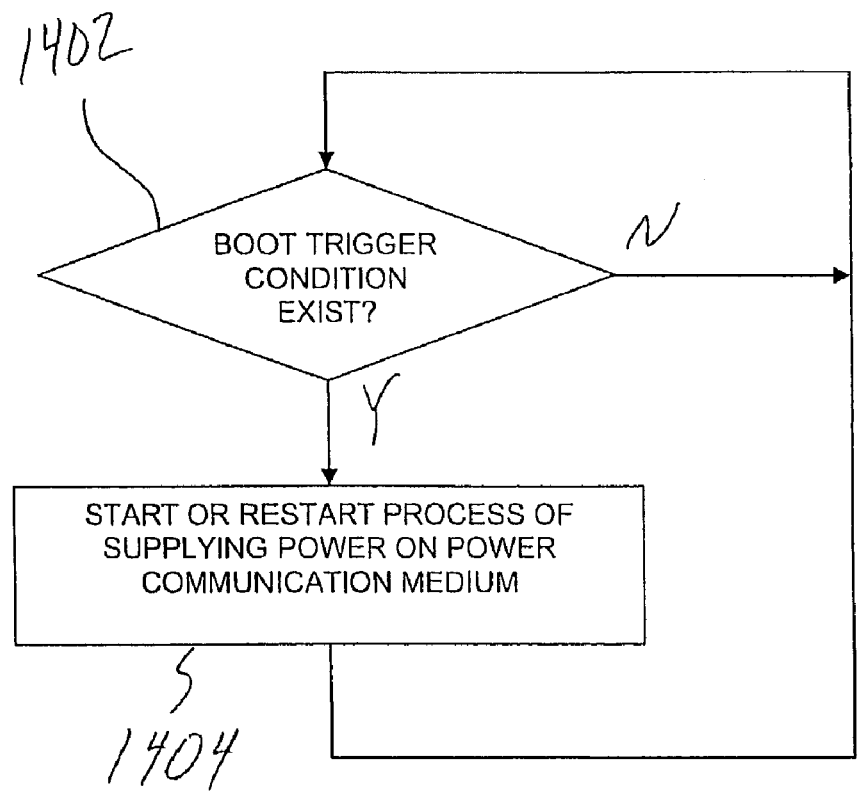
FIG. 14 is a flow diagram of one embodiment of a method of monitoring a primitive related to the supplying power to a power communication medium and controlling the supply of power to the power communication medium based on the primitive.

FIG. 14 is a flow diagram of one embodiment of a method 1400 of monitoring a primitive related to the supplying power to a power communication medium and controlling the supply of power to the power communication medium based on the primitive. Embodiments of method 1400 are suitable for use with embodiments of method 1000 and embodiments of network elements described in connection with FIG. 10. Method 1400 includes detecting a boot trigger condition (block 1402) and when a boot trigger condition is detected, starting or restarting the process of supplying power on the power communication medium (block 1404).

For example, in one embodiment, the network element can be instructed to stop supplying power on the power communication medium by shorting the ring and tip lines of twisted-pair telephone line together (or by applying a low voltage across the ring and tip lines). When such a short is detected, the network element stops supplying power on the power communication medium. Then, the network can be instructed to again start supplying power on the power communication medium by removing the short between the ring and tip lines. When the short is removed, the power is again supplied. In one such embodiment, applying the short to the ring and tip lines invokes a controlled shutdown of a power supply included in the network element. When the short is removed, the power supply is rebooted (that is, restarted) and continues to supply power on the power communication medium. This allows a remote field technician servicing a sink network element to control the supply of power by a source network element.

In another embodiment of method 1400, the network element periodically attempts to boot a power supply that is used by the network element to supply power on the communication medium. For example, a timer or similar device is used to determine when a predetermined period has elapsed since the network element stopped supplying power on the power communication medium. When the period has elapsed, the network element attempts to supply power on the power communication medium.

In some embodiments of method 1400, if the network element determines that there is an operational sink network element coupled to the power communication medium, the source network element attempts to supply power to that sink network element by applying power to the power communication medium (for example, at reduced power level). If the source network element detects that the sink network element has successfully started to receive power from the power communication (for example, by measuring the amount of current supplied on the power communication medium and/or some other power-related attribute such as an overload condition), the source network element continues to supply power on the communication medium (for example, by increasing the amount of power supplied on the power communication medium to full power). In some embodiments, this process of attempting to supply power and detecting if a sink network element has successfully started to receive power involves ramping up the power supplied on the power communication medium. An example of one such embodiment is described in the '593 Application.

Figure 15:
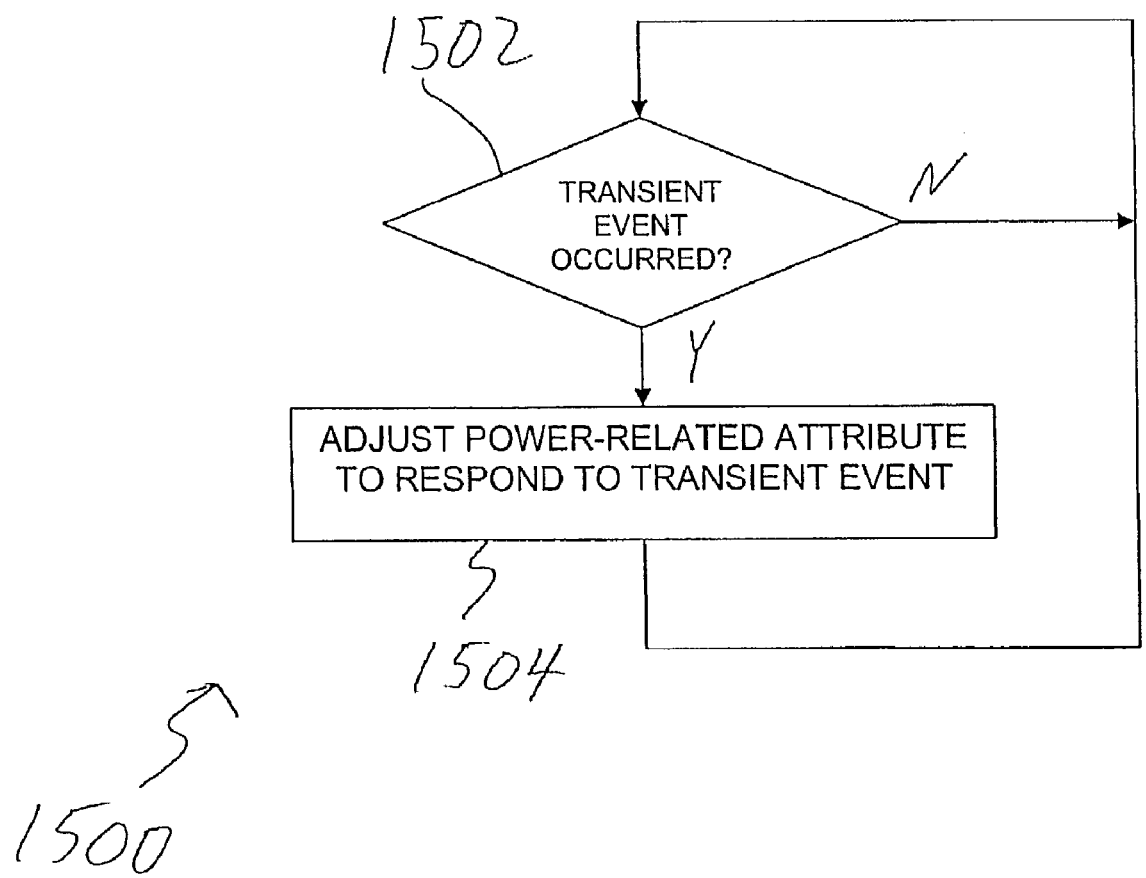
FIG. 15 is a flow diagram of one embodiment of a method of monitoring a primitive related to supplying power to a power communication medium and controlling the supply of power to the power communication medium based on the primitive.

FIG. 15 is a flow diagram of one embodiment of a method 1500 of monitoring a primitive related to supplying power to a power communication medium and controlling the supply of power to the power communication medium based on the primitive. Embodiments of method 1500 are suitable for use with embodiments of method 1000 and embodiments of network elements described in connection with FIG. 10. Method 1500 includes determining if a transient event has occurred based on one or more primitives (block 1502). When a transient event occurs, at least one power related attribute of the network element is adjusted to respond to the transient event (1504). Examples of transient events include impulse transients (for example, resulting from power surges) and interruptions of the supply of power by the network element over the power communication medium.

In one embodiment, the transient event is an impulse transient event such as a lightening strike or a power cross surge. Such a transient event is detected by detecting when the rate of change of a power-related attribute (for example, voltage or current) changes at a rate greater than a threshold rate of change or when a power-related attribute exceeds some threshold value. In one embodiment, when such an impulse transient is detected, the impulse transient is filtered by limiting the rate of change of the power-related attribute. In some embodiment, filtering reduces the occurrence or impact of negative effects (for example, overload conditions or fuses blowing) that result from such impulse transients.

In other embodiments, when such an impulse transient event occurs a protection device (for example, a sidactor) activates to shunt, for example, a current surge to ground. In one such embodiment, the protection device activates when the voltage across the protection device exceeds a turn-on voltage. In such an embodiment, in order to reset the protection device (that is, turn the protection device off), a power supply of the network element is turned off or rebooted. An example of such an embodiment is described in the '591 Application.

Tables 1, 2, 3, 4 and 5 describe various primitives that are used in one embodiment of a network that includes a source network element and a sink network element. In this embodiment, the power communication medium and the service communication medium are included in the same communication medium and include one or more twisted-pair telephone lines. In the following description, the twisted-pair telephone lines on which power is supplied are sometimes referred to as "pair supplies."

Table 1 describes various provisioning primitives. Table 2 describes various alarm and status primitives. Table 3 describes various network element protocol primitives. Table 4 describes various source network element primitives. Table 5 describes various sink network element primitives.

TABLE 1

Provisioning Primitives

| Primitive | Description |
| --- | --- |
| Maxsysoutputpower | This is the maximum power allowed to be delivered to the output of the power supply by all the individual pair supplies combined. It may or may not be the same as the hardware limitation but will never exceed the maximum hardware limitation. This threshold value can be used for alarm and/or power save functions. |
| Maxsysoutputvoltage | This is the maximum voltage allowed to be delivered to the output of the power supply by all the individual pair supplies combined. It may or may not be the same as the hardware limitation but will never exceed the maximum hardware limitation. This threshold value can be used for alarm and/or power save functions. |
| Maxsysoutputcurrent | This is the maximum current allowed to be delivered to the output of the power supply by all the individual pair supplies combined. It may or may not be the same as the hardware limitation but will never exceed the maximum hardware limitation. This threshold value can be used for alarm and/or power save functions. |
| Maxpairoutputpower | This is the maximum power allowed to be delivered to the output of an individual pair power supply. It may or may not be the same as the hardware limitation but will never exceed the maximum hardware limitation. This threshold value can be used for alarm and/or power save functions. |

TABLE 1-continued

Provisioning Primitives

| Primitive | Description |
| --- | --- |
| Maxpairoutputvoltage | This is the maximum voltage allowed to be delivered to the output of an individual pair power supply. It may or may not be the same as the hardware limitation but will never exceed the maximum hardware limitation. This threshold value can be used for alarm and/or power save functions. |
| Maxpairoutputcurrent | This is the maximum current allowed to be delivered to the output of an individual pair power supply. It may or may not be the same as the hardware limitation but will never exceed the maximum hardware limitation. This threshold value can be used for alarm and/or power save functions. |
| Numofpairsinpwrsystem | Number of individual pair power supplies in the total system powering the sink network element. |
| Targetpairoutputpower[x] | This is the target power value for each pair during normal system operation when all pair are operational. In the event one or more pairs fail as indicated by PairOutputpowersupplyfailure[x] then NEpowersupplycontrol may automatically increase the power delivered over the remaining pairs. This optional procedure is conditional on not violating any other parameters. |
| LoopProfileLimit[x] | This set of parameters defines both the static and dynamic parameters for the complete system (loop and sink network element). For the sink network element case the dynamic behavior during boot up can be used to predict that a valid sink network element exists. For the loop itself |
| TDRLoopProfile[x] | This set of parameters defines both the static and dynamic parameters of the loop itself. This information will model the TDR behavior of the loop, and therefore this data can be utilized to predict the physical layer performance of the loop for the various xDSL protocols. |

TABLE 2

Alarm and Status Primitives

| Primitive | Description |
| --- | --- |
| SysOutputpoweroverload | The total combined output power has exceeded system capacity. Sink network element would need to reduce its power consumption to clear this problem. |
| SysPowerFailure | The total combined output power has exceeded system capacity for a long enough time to nearly cause loss of power supply regulation. Sink network element generates a dying gasp message with this primitive to declare a system failure. |
| SysOutputpowersupplyfailure | The total combined power supply output has failed. Sink network element is not receiving power. |
| PairOutputovercurrent | Actual output current on an individual power supply has exceeded it's capacity. Source network element control algorithm needs to adjust output parameters among remaining supplies to compensate, if possible. |
| PairOutputovervoltage | Actual output voltage on an individual power supply has exceeded it's capacity. Source network element control algorithm needs to adjust output parameters among remaining supplies to compensate, if possible. |
| PairOutputpowersupplyfailure[x] | Individual pair power supply output has failed. |
| PowerLoopgroundfault[x] | Individual pair power supply output has a ground fault. |

TABLE 3

Network Element Protocol Primitives

| Primitive | Description |
| --- | --- |
| Service_types | This primitive allows the source network element to determine which types of services are supported by the sink network element. |
| Service_priority | This primitive allows the source network element to set the priority for the services offered by the sink network element. |
| Service_control | This primitive allows the source network element to control which services are operational at the sink network element. |
| Service_alarms | This primitive allows the sink network element to alert the source network element that services have been affected due to power or thermal issues. |
| Service_fast_off | This primitive commands the source network element to invoke the power supply fast off procedure. This is immediately followed by a fast power supply on procedure. (the power supply returns to its previous normal power on state) |
| Power_requirements | This primitive allows the sink network element to indicate its power requirements to the source network element. |
| Power_status | This primitive allows the sink network element to indicate how much power is being used to support the services. |
| Power_alarms | This primitive allows the sink network element to alert the source network element that power has been lost on one or more of the power lines. |
| Voltage_requirements | This primitive allows the sink network element to indicate its voltage requirements to the source network element. |
| Voltage_status | This primitive allows the sink network element to indicate to the source network element the status of the voltage received at the sink network element. |
| Thermal_requirements | This primitive allows the sink network element to indicate its thermal requirements to the source network element. |
| Thermal_status | This primitive allows the sink network element to indicate to the source network element the thermal conditions at the sink network element. |
| Thermal_alarms | This primitive allows the sink network element to alert the source network element that the temperature at the sink network element has exceeded its operational threshold. |

TABLE 4

Source Network Element Primitives

| Primitive | Description |
| --- | --- |
| Power_status | This primitive allows the source network element power management layer to monitor the power being supplied to each power line. Valid states are; normal power, low power, high power. (this may implemented with either voltage or current techniques) |
| Power_control | This primitive allows the source network element power management layer to control the power being supplied to each power line. (this may implemented with either voltage or current techniques) |
| Voltage_control | This primitive allows the source network element power management layer to control the power supply voltage setting. |

TABLE 5

Sink Network Element Primitives

| Primitive | Description |
| --- | --- |
| Power_status | This primitive allows the sink network element power management layer to monitor the current on each of the power lines and the complete network element system. Valid states are; normal power, low power. |
| Voltage_status | This primitive allows the sink network element power management layer to monitor the voltage from the power lines. Valid states are; normal voltage, low voltage. |
| Low_power_threshold[x] | These output primitive(s) may trigger various power save functions |
| Service_control | This primitive allows the sink network element power management layer to turn services on and off. |

Although embodiments of the various methods are described here as sequential steps, this functionality can be implemented in many ways. For example, the functionality can be implemented in analog and/or digital electronic circuitry, or with a programmable processor (for example, a special-purpose processor or a general-purpose process such as a computer), firmware, software, or in combinations of them. In one embodiment, apparatus embodying these techniques include appropriate input and output devices, a programmable processor, and a storage medium tangibly embodying program instructions for execution by the programmable processor. In one embodiment, a process embodying these techniques are performed by a programmable processor executing a program of instructions to perform desired functions by operating on input data and generating appropriate output. In one embodiment, the techniques advantageously are implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A method of controlling power in a network element, comprising:

powering the network element by receiving power from a power communication medium;

providing a telecommunication service over a service communication medium;

receiving management information via a primitive related to the powering of the network element;

monitoring the primitive related to the powering of the network element; and controlling the powering of the network element based on the primitive.

2. The method of claim 1, controlling the powering of the network element based on the primitive includes adjusting a power-related parameter.

3. The method of claim 2, wherein adjusting a power-related parameter includes adjusting the power used by the network element.

4. The method of claim 3, wherein adjusting the power used by the network element includes operating at least a portion of the network element in a low-power mode.

5. The method of claim 4, wherein providing the telecommunication service over the service communication medium includes providing a plurality of telecommunication services over the service communication medium, and wherein operating the at least a portion of the network in the low-power mode includes providing at least one of the plurality of telecommunications in a degraded mode.

6. The method of claim 5, wherein the at least one of the plurality of telecommunication services that operates in the degraded mode has a low priority.

7. The method of claim 6, wherein the plurality of telecommunication services includes voice service and a data service, wherein the at least one of the plurality of telecommunication services that operates in the degraded mode includes the data service.

8. The method of claim 2, wherein operating the at least a portion of the network in the low-power mode includes operating the at least a portion of the network element at a lower clock rate in the low-power mode.

9. The method of claim 3, wherein adjusting the power used by the network element includes operating at least a portion of the network element in a full-power mode.

10. The method of claim 9, wherein providing the telecommunication service over the service communication medium includes providing a plurality of telecommunication services over the service communication medium, and wherein operating the at least a portion of the network element in the full-power mode includes operating at least one of the plurality of telecommunication services at full-speed.

11. The method of claim 10, wherein the at least one of the plurality of telecommunication services that is operated at full-speed has a high priority.

12. The method of claim 11, wherein the plurality of telecommunication services includes voice service and a data service, wherein the at least one of the plurality of telecommunication services is operated at full-speed include the data service.

13. A method of controlling power in a network element, comprising:

supplying power to a power communication medium;

providing a telecommunication service over a service communication medium;

receiving management information via a primitive related to supplying power to the power communication medium;

monitoring the primitive related to supplying power to the power communication medium; and controlling supplying power to the power communication medium based on the primitive.

14. The method of claim 13, wherein monitoring the primitive related to supplying power to the power communication medium includes determining a threshold level of power;

determining an amount of power currently available to be supplied to the power communication medium by the network element; and when a predetermined relationship exists between the threshold level and the power currently available to be supplied to the power communication medium, adjusting a power-related attribute of the network element.

15. The method of claim 14, wherein adjusting the power-related attribute of the network element includes invoking one or more power save functions when the amount of power currently available for use by the network element is less than the threshold level.

16. The method of claim 15, wherein the power save function includes operating at least a portion of the network element in a low-power mode.

17. The method of claim 16, wherein operating at least the portion of the network element in the low-power mode includes reducing the amount of power supplied on the power communication medium.

18. The method of claim 16, wherein operating at least the portion of the network element in the low-power mode includes providing one or more telecommunication services at a reduced service level.

19. The method of claim 16, wherein operating at least the portion of the network element in the low-power mode includes operating at least the portion of the network element at a lower clock rate.

20. The method of claim 1, wherein the power communication medium and the service communication medium are included in the same communication medium.

21. The method of claim 1, wherein the power communication medium and the service communication medium are included in separate communication media.

22. The method of claim 1, wherein the power communication medium includes at least one twisted-pair telephone line.

23. The method of claim 1, wherein the network element is located in an access network.

24. The method of claim 1, wherein the network element is located at a customer location.

25. The method of claim 2, wherein adjusting the power used by the network element includes stopping the functioning of at least a portion of the network element.

26. The method of claim 25, wherein providing the telecommunication service over the service communication medium includes providing a plurality of telecommunication services over the service communication medium, and wherein stopping the functioning of the at least a portion of the network element includes stopping at least one of the plurality of telecommunication services.

27. The method of claim 26, wherein the at least one of the plurality of telecommunication services that is stopped has a low priority.

28. The method of claim 27, wherein the plurality of telecommunication services includes voice service and a data service, wherein the at least one of the plurality of telecommunication services that is stopped includes the data service.

29. The method of claim 25, wherein the power-related parameter includes the power transfer efficiency of the power communication medium.

30. The method of claim 29, controlling the powering of the network element based on the primitive includes adjusting the power-related parameter to optimize the power transfer efficiency of the power communication medium.

31. The method of claim 29, wherein the power-related parameter includes the power dissipated in the power communication medium.

32. The method of claim 31, controlling the powering of the network element based on the primitive includes adjusting the power-related parameter to optimize the power transfer efficiency of the power communication medium.

33. The method of claim 2, wherein adjusting the power-related parameter includes adjusting the power-related parameter when the primitive indicates that the primitive has one of the following relationships with a threshold: the primitive is below the threshold, the primitive is above the threshold, and the primitive is equal to the threshold.

34. The method of claim 2, wherein adjusting the power-related parameter includes adjusting the power-related parameter when the primitive indicates that there is insufficient power from the power communication medium to power the network element at full power.

35. The method of claim 2, farther comprising calculating a power headroom value, wherein adjusting the power-related parameter includes adjusting the power-related parameter based on the calculated power headroom value.

36. The method of claim 1, farther comprising calculating the power used by the network element.

37. The method of claim 36, wherein calculating the power used by the network element including calculating at least one of the following: a percent of power used by the network element and a number of watts of power used by the network element relative to the total number of watts of power available from the power communication medium.

38. The method of claim 36, wherein calculating the power used by the network element including estimating a power headroom value from the primitive.

39. The method of claim 38, wherein estimating the power headroom value from the primitive includes estimating the power headroom value iteratively.

40. The method of claim 1, further comprising determining which of a plurality of communication media to receive power from based on the primitive.

41. The method of claim 40, wherein determining which of the plurality of communication media to receive power from based on the primitive includes determining if one of the plurality of power communication media is degraded and determining that power should be received from at least one power communication media other than the degraded power communication medium.

42. The method of claim 1, further comprising determining when an impulse transient occurs on the power communication medium based on the primitive.

43. The method of claim 42, further comprising filtering the impulse transient when the impulse transient occurs on the power communication medium.

44. The method of claim 43, wherein filtering the impulse transient when includes adjusting at least one of a voltage used by the network element and a current used by the network element.

45. The method of claim 1, further comprising:
 storing power received from the power communication medium;
 determining when the power supplied on the power communication medium is interrupted; and
 powering the network element using the stored power when the power supplied on the power communication medium is interrupted.

46. The method of claim 45, wherein storing the power received from the power communication medium includes storing the power received from the power communication medium in a capacitor.

47. The method of claim 45, wherein the power supplied on the power communication medium is interrupted when a source network element coupled to the power communication medium is executing a boot up procedure.

48. The method of claim 1, farther comprising supplying power to a second power communication medium.

49. The method of claim 13, wherein the power communication medium and the service communication medium are included in the same communication medium.

50. The method of claim 13, wherein the power communication medium and the service communication medium are included in separate communication media.

51. The method of claim 13, wherein the power communication medium includes at least one twisted-pair telephone line.

52. The method of claim 13, wherein the network element is located in an access network.

53. The method of claim 13, wherein the network element is located at a customer location.

54. The method of claim 14, wherein the threshold level is the amount of power needed to supply power to the power communication medium at a predetermined maximum power level.

55. The method of claim 14, wherein the threshold level is the amount of power needed by the network element to provide enough power on the power communication medium so that a sink network element will receive enough power from the power communication medium to provide a given set of telecommunication services at a given service level.

56. The method of claim 14, wherein the threshold level of power is determined dynamically during operation of the network element based on various operational parameters of the network element.

57. The method of claim 14, wherein determining the amount of power currently available to be supplied to the power communication medium by the network element includes:
 measuring one or more power-related attributes; and
 calculating the power currently available to be supplied to the power communication medium.

58. The method of claim 57, wherein the one or more measured power-related attributes includes at least one of: a current supplied by a power source coupled to the network element and a voltage supplied by a power source coupled to the network element.

59. The method of claim 57, wherein the predetermined relationship between the threshold level and the power currently available to be supplied to the power communication medium is one of the following: the threshold level is less than the power currently available to be supplied, the threshold level is equal to the power currently available to be supplied, and the threshold level is greater than the power currently available to be supplied.

60. The method of claim 15, wherein the power save function includes stopping the functioning of at least a portion of the network element.

61. The method of claim 60, wherein stopping the functioning of the at least a portion of the network element includes stopping providing one or more telecommunication services typically provided by the network element.

62. The method of claim 15, wherein at least one power save function is invoked iteratively.

63. The method of claim 14, wherein adjusting the power-related attribute of the network element includes, when the amount of power currently available is greater than the threshold level, increasing the amount of power supplied to the power communication medium.

64. The method of claim 14, wherein adjusting the power-related attribute of the network element includes, when the amount of power currently available is greater than the threshold level, improving the way in which the telecommunication services are provided.

65. The method of claim 14, wherein adjusting the power-related attribute of the network element includes, when the amount of power currently available is greater than the power needed to apply the predetermined maximum power to the power communication medium, increasing the power level supplied to the power communication medium.

66. The method of claim 14, wherein adjusting the power-related attribute of the network element includes, when the amount of power currently available is greater than the power needed to apply the predetermined maximum power to the power communication medium, providing additional telecommunication services.

67. The method of claim 14, wherein adjusting the power-related attribute of the network element includes, when the amount of power currently available is greater than the power needed to apply the predetermined maximum power to the power communication medium, providing telecommunication services at a higher service level.

68. The method of claim 14, wherein adjusting the power-related attribute of the network element includes, when the amount of power currently available is greater than the power needed to apply the predetermined maximum power to the power communication medium, improving the power transfer efficiency of the power communication medium.

69. The method of claim 14, wherein adjusting the power-related attribute of the network element includes, when the amount of power currently available is greater than the power needed to apply the predetermined maximum power to the power communication medium, reducing the power dissipated in the power communication medium.

70. The method of claim 14, wherein adjusting the power-related attribute of the network element includes, during operation of the network element, adjusting dynamically an output voltage applied to the power communication medium based on one or more power-related attributes.

71. The method of claim 13, wherein controlling supplying power to the power communication medium based on the primitive includes:
   selecting at least one of communication medium from a plurality of communication media on which power is to be supplied; and
   supplying power on the selected communication medium.

72. The method of claim 71, wherein selecting the at least one communication medium on which power is to be supplied includes determining which communication media are suitable for supplying power and selecting the at least one communication medium from the subset of communication media that are suitable for supplying power.

73. The method of claim 71, wherein selecting the at least one communication medium on which power is to be supplied includes occurs during a normal operation when one or more communication media that were previously supplying power are unable to continue to supply power.

74. The method of claim 71, wherein selecting the at least one communication medium on which power is to be supplied includes profiling at least one of the communication media.

75. The method of claim 13, controlling supplying power to the power communication medium based on the primitive includes:
   detecting a ground fault condition; and
   when a ground fault condition is detected, reducing the power supplied on the power communication medium.

76. The method of claim 75, wherein reducing the power supplied on the power communication medium includes stopping supplying power on the power communication medium when the ground fault condition is detected.

77. The method of claim 13, wherein monitoring the primitive related to supplying power to the power communication medium includes detecting a boot trigger condition.

78. The method of claim 77, wherein controlling supplying power to the power communication medium based on the primitive includes, when a boot trigger condition is detected, starting supplying power on the power communication medium.

79. The method of claim 77, wherein boot trigger condition exist when a predetermined time period has elapsed since the supply of power stopped.

80. The method of claim 13, wherein monitoring the primitive related to supplying power to the power communication medium includes determining when a transient event has occurred based on one or more primitives.

81. The method of claim 80, wherein controlling supplying power to the power communication medium based on the primitive includes adjusting at least one power related attribute of the network element to respond to the transient event when the transient event occurs.

82. The method of claim 80, wherein the transient event includes one of the following: an impulse transient, an interruption of the supply of power to the network element over the power communication medium.

83. The method of claim 82, wherein the impulse transient includes one of the following: a lightening strike or a power cross surge.

84. The method of claim 80, wherein determining when the transient event has occurred based on one or more primitives comprises detecting when a rate of change of a power-related attribute changes at a rate greater than a threshold rate of change.

85. The method of claim 84, wherein adjusting at least one power related attribute of the network element to respond to the transient event when the transient event occurs includes filtering the transient.

86. The method of claim 85, wherein filtering the transient includes limiting the rate of change of the power-related attribute.

* * * * *